(12) United States Patent
Kawakami et al.

(10) Patent No.: US 7,495,842 B2
(45) Date of Patent: Feb. 24, 2009

(54) ZOOM LENS AND PROJECTOR UNIT

(75) Inventors: Etsuro Kawakami, Akishima (JP); Yasuyuki Tejima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/879,691

(22) Filed: Jul. 17, 2007

(65) Prior Publication Data
US 2008/0019019 A1  Jan. 24, 2008

(30) Foreign Application Priority Data
Jul. 24, 2006  (JP) .............................. 2006-201335

(51) Int. Cl.
*G02B 15/14* (2006.01)
(52) U.S. Cl. ...................... 359/689; 359/690
(58) Field of Classification Search ......... 359/689–690, 359/686–687
See application file for complete search history.

(56) References Cited

U.S. PATENT DOCUMENTS

| | | | |
|---|---|---|---|
| 5,550,679 A | 8/1996 | Sugawara | |
| 5,644,433 A * | 7/1997 | Ikari | 359/687 |
| 6,016,228 A * | 1/2000 | Uzawa | 359/687 |
| 6,308,011 B1 | 10/2001 | Wachi et al. | |
| 6,412,972 B1 | 7/2002 | Pujol et al. | |
| 6,888,682 B2 | 5/2005 | Kawakami | |

(Continued)

FOREIGN PATENT DOCUMENTS

CN   1527069 C   9/2004

(Continued)

OTHER PUBLICATIONS

"Digital Micromirror Device" downloaded from Wikipedia, the free encyclopedia, http://en.wikipedia.org/wiki/digital_micromirror_device., downloaded Jan. 3, 2008, 2 pages.

(Continued)

*Primary Examiner*—Ricky Mack
*Assistant Examiner*—James R Greece
(74) *Attorney, Agent, or Firm*—Frishauf, Holtz, Goodman & Chick, P.C.

(57) ABSTRACT

To provide a compact, high-performance zoom lens having a small lens aperture for enlarging an image from a light valve such as a DMD for forming an image by changing a reflecting direction of light and projecting the image so enlarged on to a screen or the like, the zoom lens includes, in order from a magnifying side, a first lens group having a positive or negative refractive power as a whole, a second lens group having a negative refractive power as a whole and a third lens group having a positive refractive power as a whole, wherein changing the magnification of a whole lens system thereof is attained by configuring such that while a magnification varying operation is in effect, the first lens group is left fixed, and the second lens group and the third lens group are made to move on the optical axis.

11 Claims, 16 Drawing Sheets

U.S. PATENT DOCUMENTS

| | | |
|---|---|---|
| 7,149,038 B2 | 12/2006 | Ho et al. |
| 7,152,979 B2 | 12/2006 | Ellis et al. |
| 2008/0019020 A1 | 1/2008 | Kawakami et al. |
| 2008/0019021 A1 | 1/2008 | Kawakami et al. |
| 2008/0024877 A1 | 1/2008 | Kawakami |

FOREIGN PATENT DOCUMENTS

| | | |
|---|---|---|
| JP | 2001-188171 A | 7/2001 |
| JP | 2004-271668 A | 9/2004 |

OTHER PUBLICATIONS

"DMD (Digital Micro-Mirror Device)", About.com: Home Theater http://hometheater.about.com/od/televisionbasics/g/dmddef.htm?p=1, downloaded Jan. 3, 2008, 1 page.

"Thefreedictionary.com" Digital micromirror device—encyclopedia article about Digital micr . . . http://encyclopedia.thefreedictionary.com/p.Digital+micromirror+device, downloaded Jan. 3, 2008, 2 pages.

* cited by examiner (EMBODIMENT 1)

FIG. 2
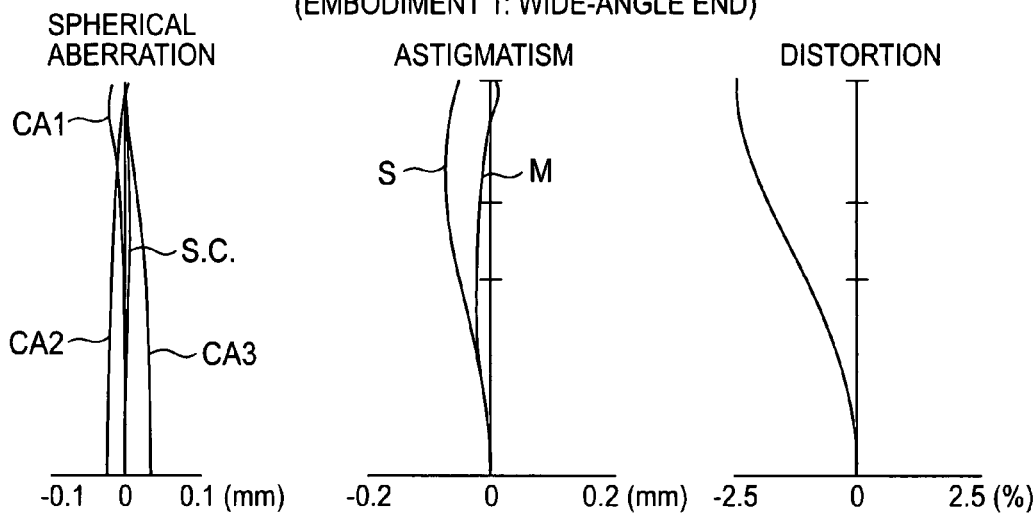
(EMBODIMENT 1: WIDE-ANGLE END)
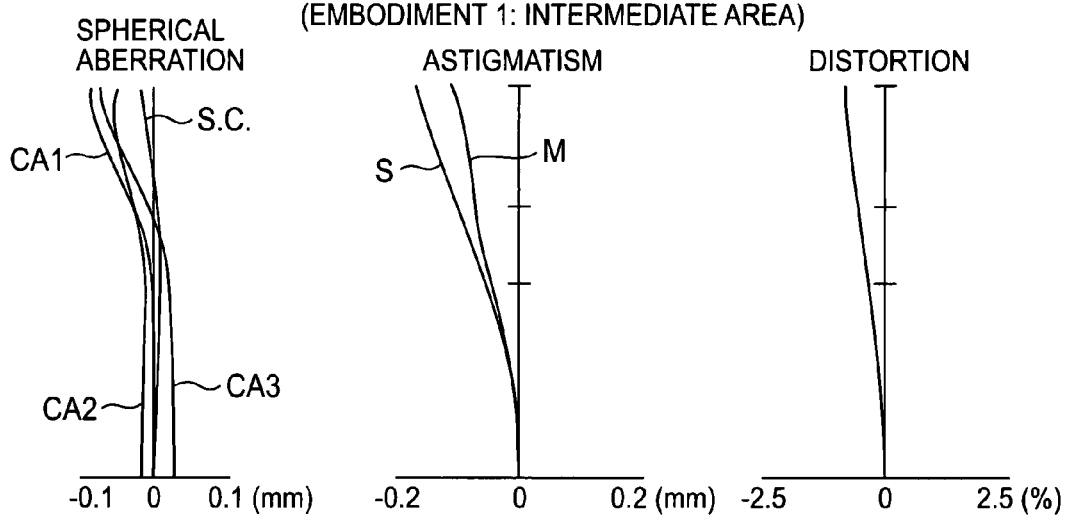
(EMBODIMENT 1: INTERMEDIATE AREA)
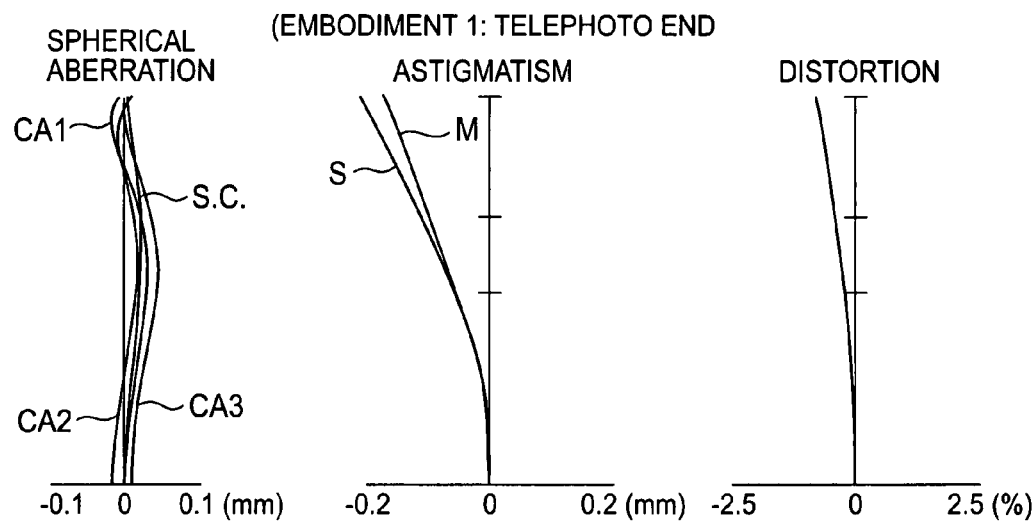
(EMBODIMENT 1: TELEPHOTO END)

(EMBODIMENT 2)

FIG. 4
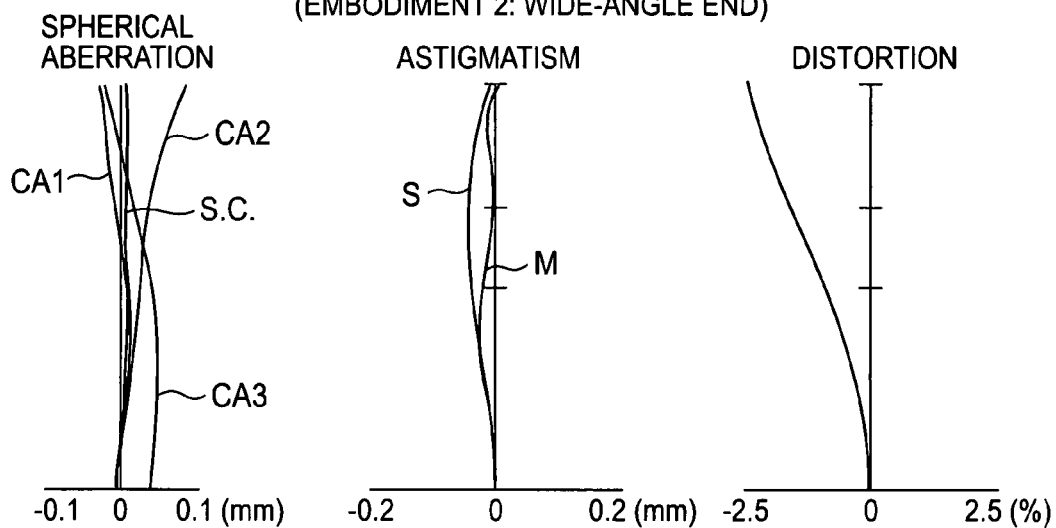
(EMBODIMENT 2: WIDE-ANGLE END)
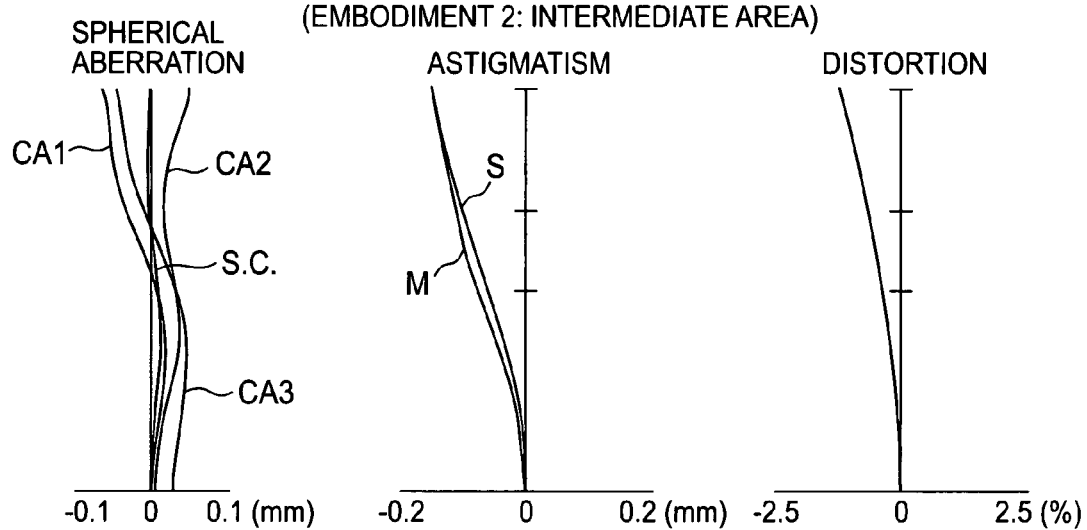
(EMBODIMENT 2: INTERMEDIATE AREA)
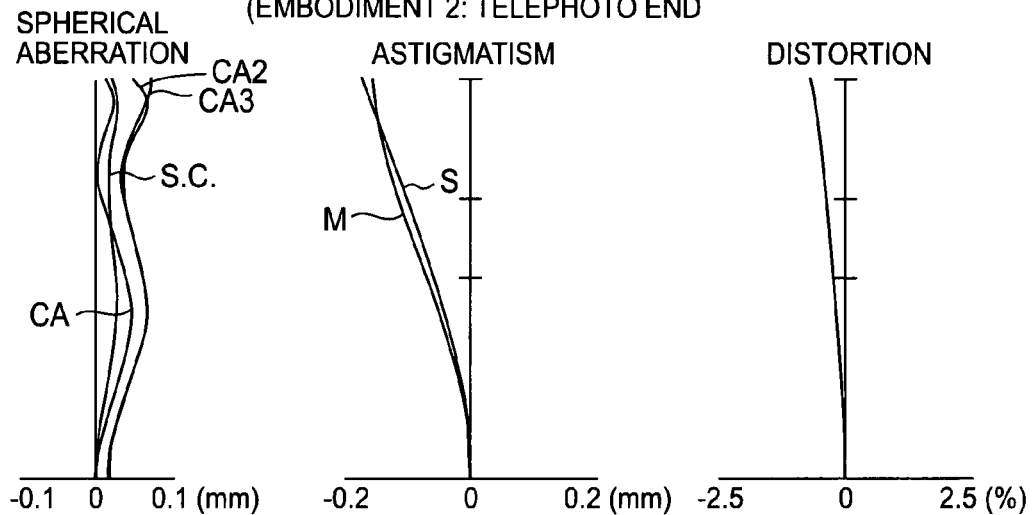
(EMBODIMENT 2: TELEPHOTO END)

FIG. 6
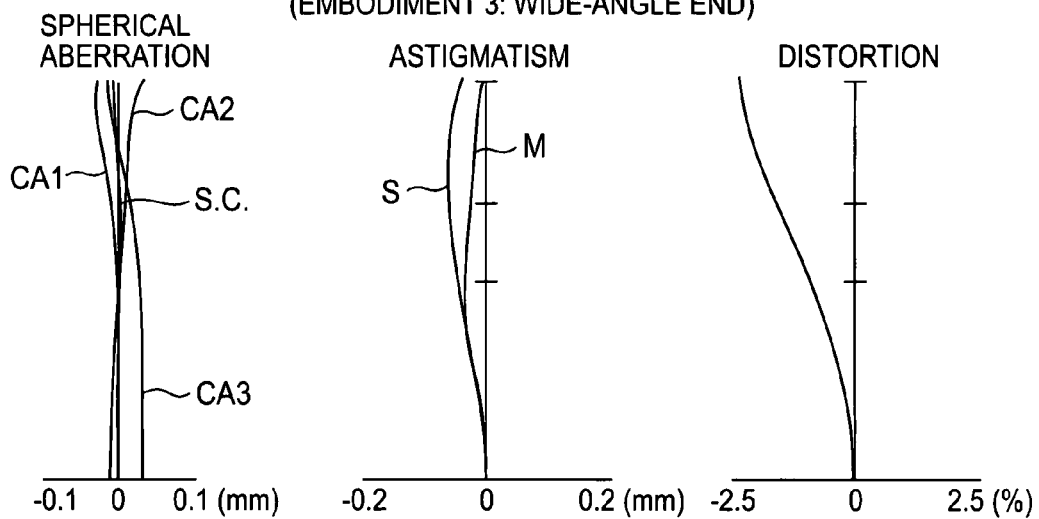
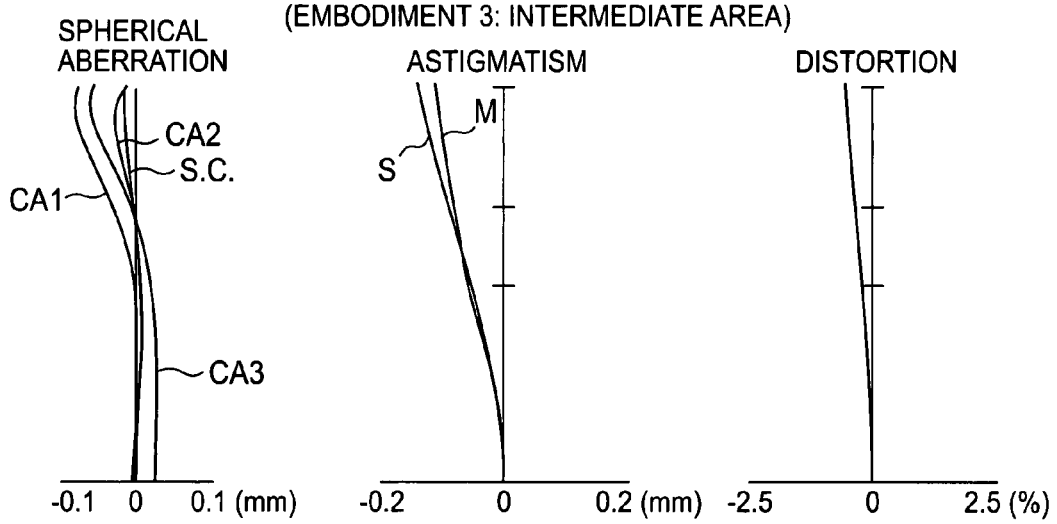
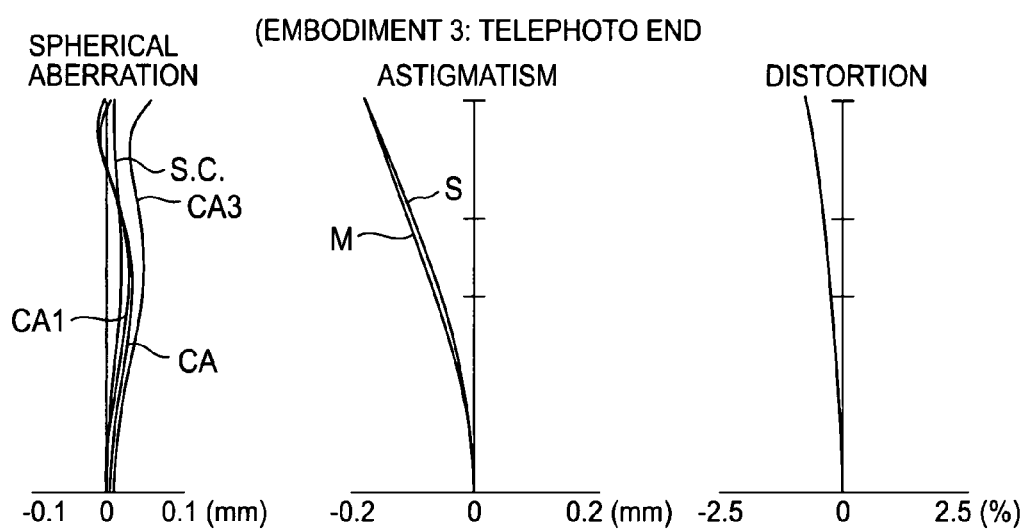

(EMBODIMENT 4)

FIG. 8
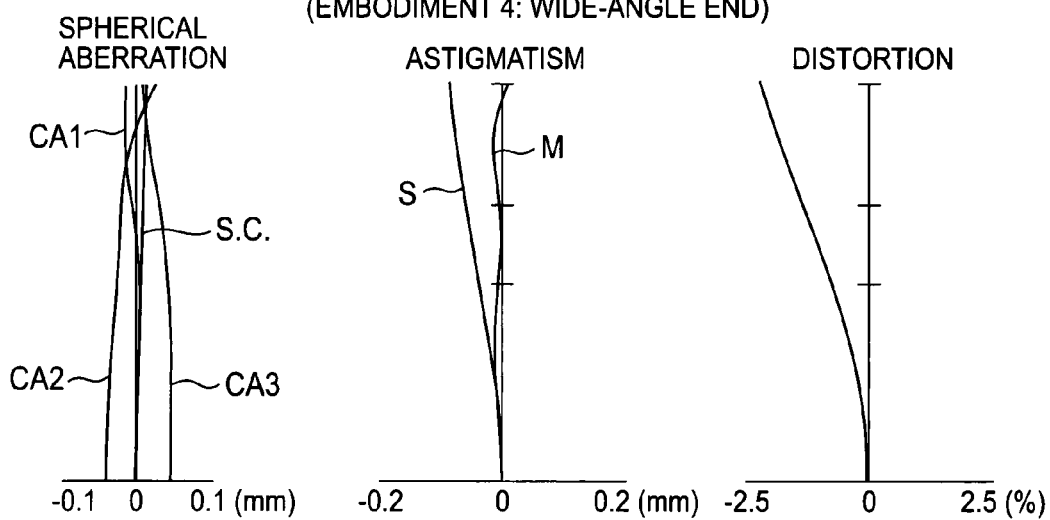
(EMBODIMENT 4: WIDE-ANGLE END)
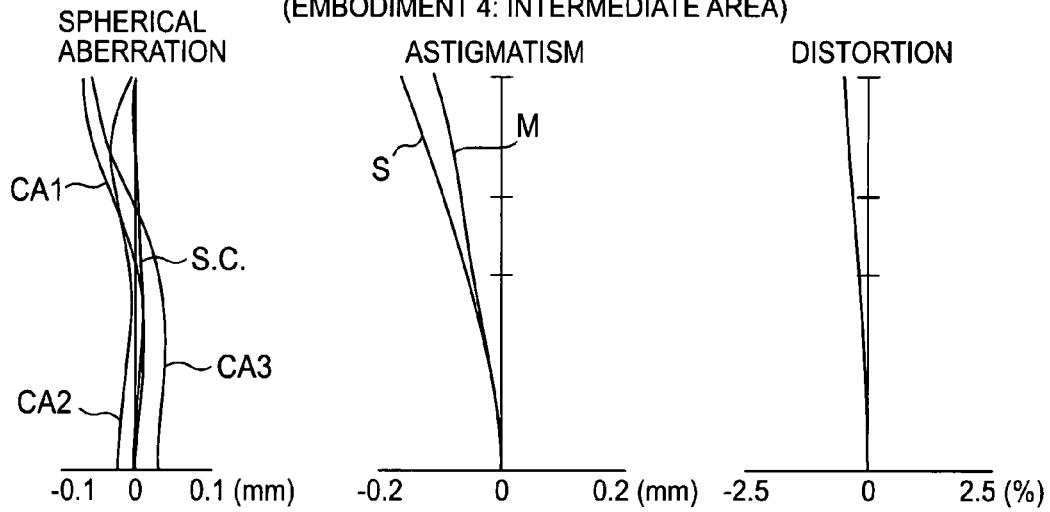
(EMBODIMENT 4: INTERMEDIATE AREA)
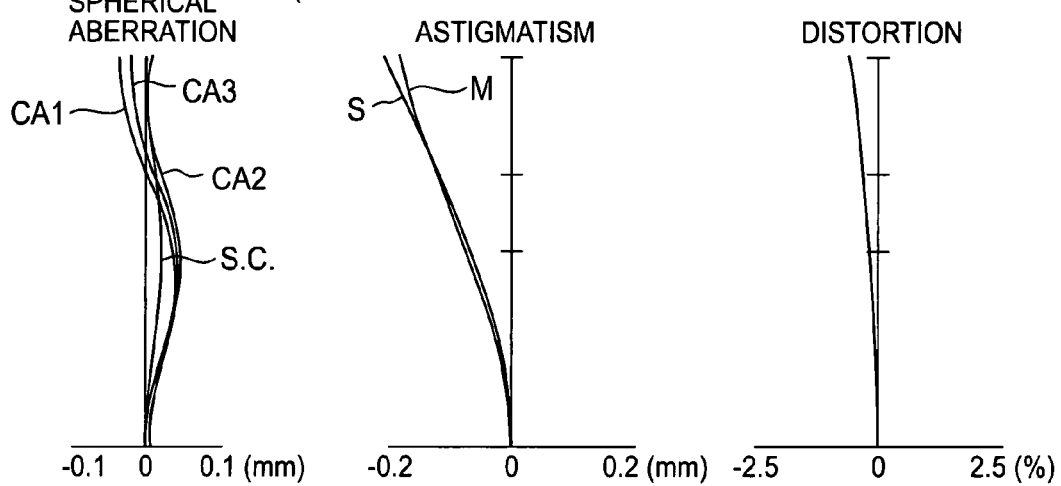
(EMBODIMENT 4: TELEPHOTO END)

(EMBODIMENT 5)

FIG. 10
(EMBODIMENT 5: WIDE-ANGLE END)
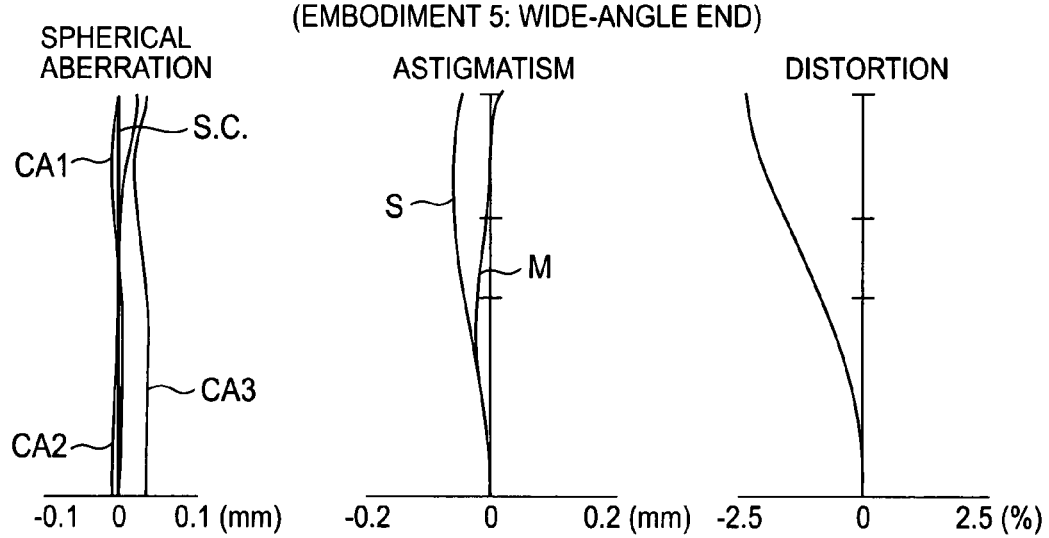
(EMBODIMENT 5: INTERMEDIATE AREA)
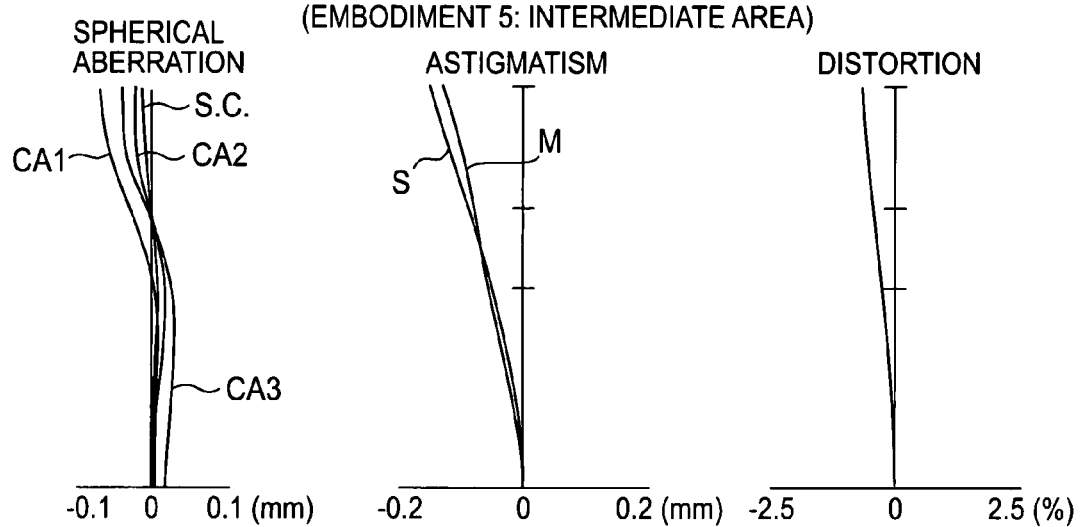
(EMBODIMENT 5: TELEPHOTO END)
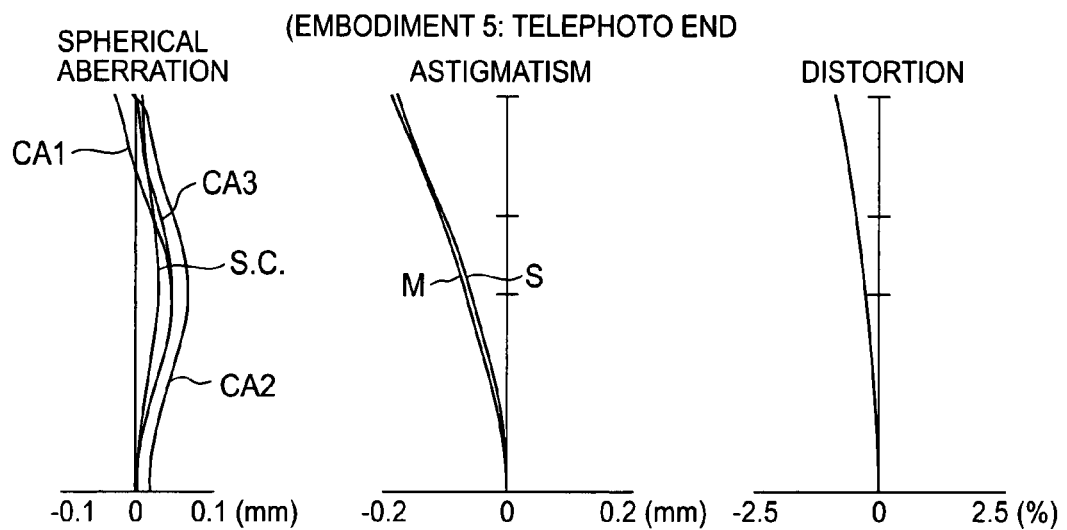

(EMBODIMENT 6)

FIG. 12
(EMBODIMENT 6: WIDE-ANGLE END)
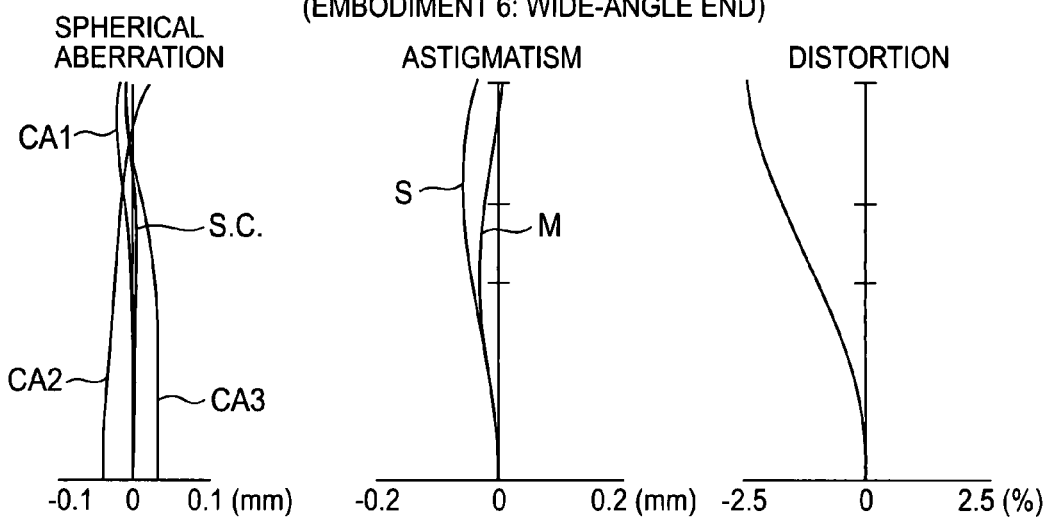
(EMBODIMENT 6: INTERMEDIATE AREA)
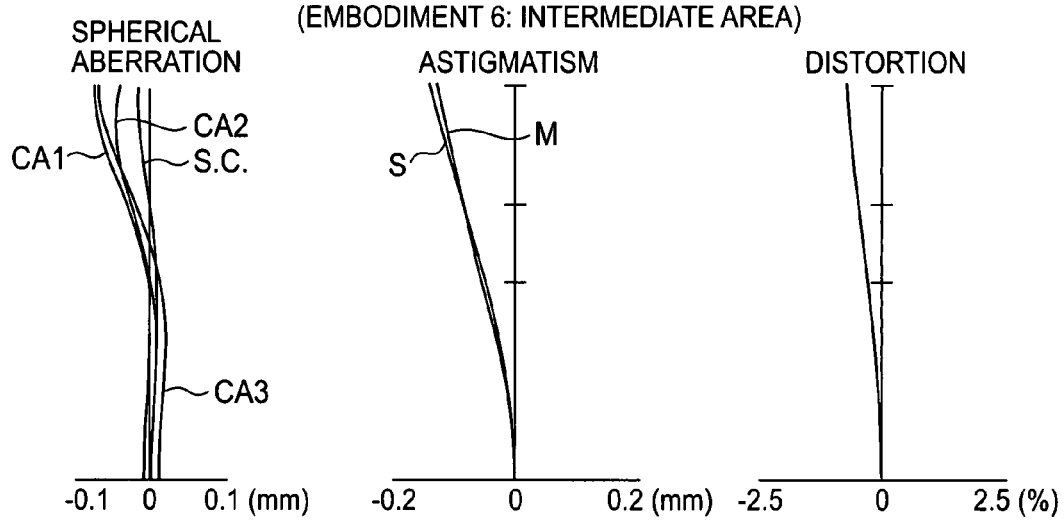
(EMBODIMENT 6: TELEPHOTO END)
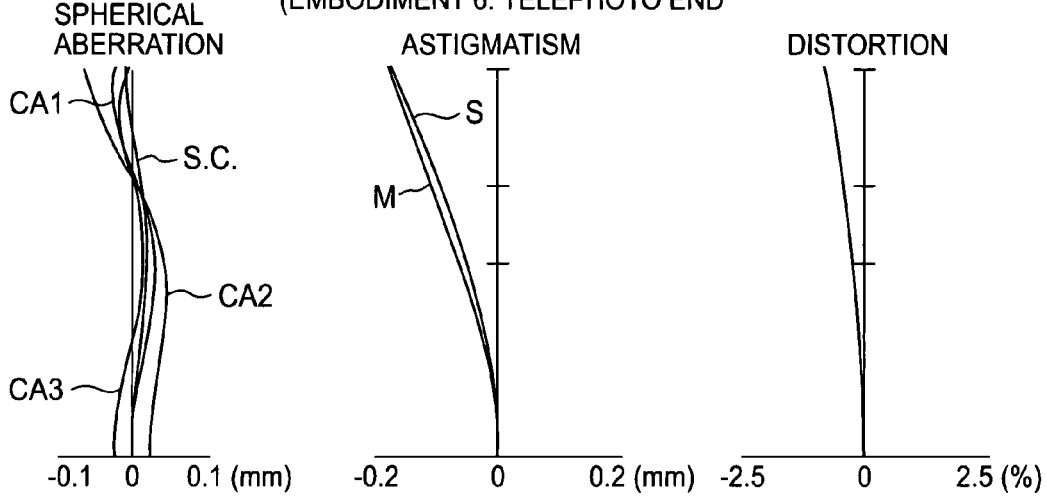

(EMBODIMENT 7)

FIG. 14
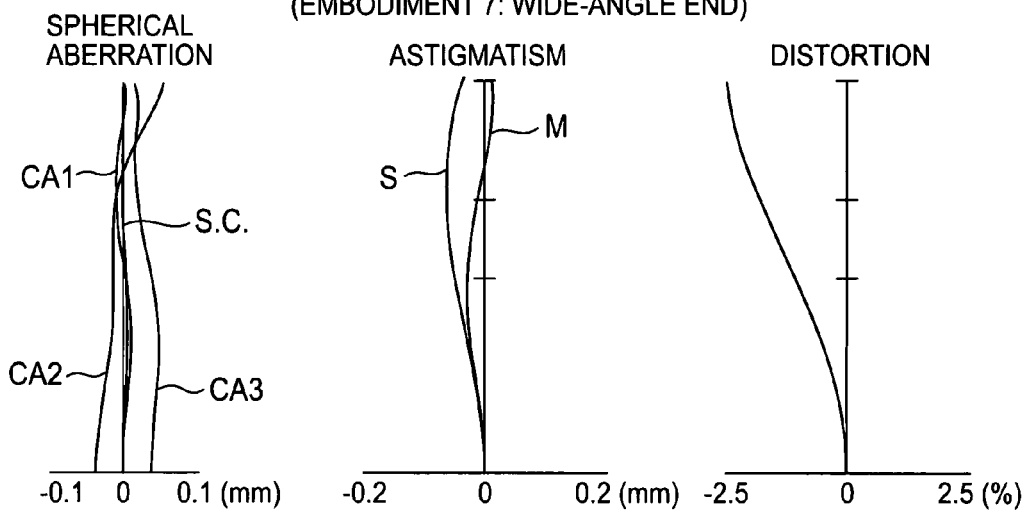
(EMBODIMENT 7: WIDE-ANGLE END)
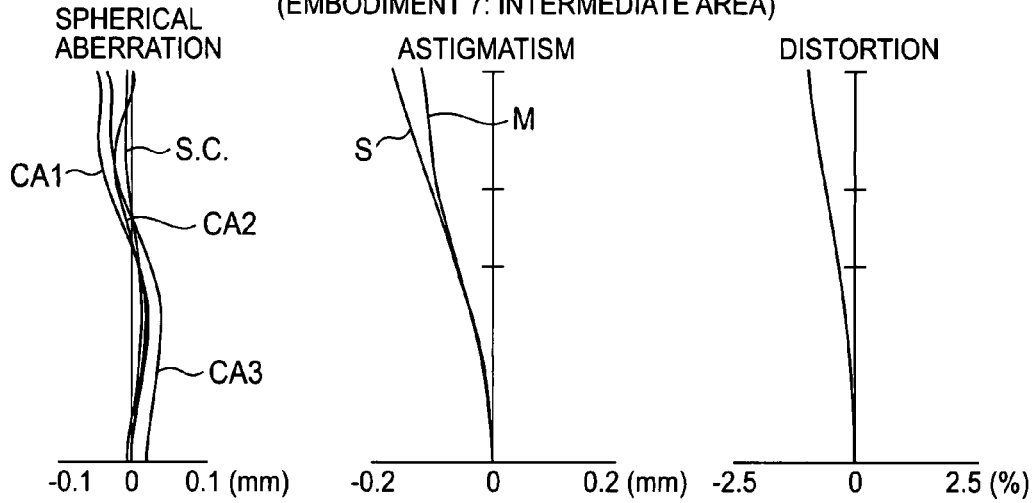
(EMBODIMENT 7: INTERMEDIATE AREA)
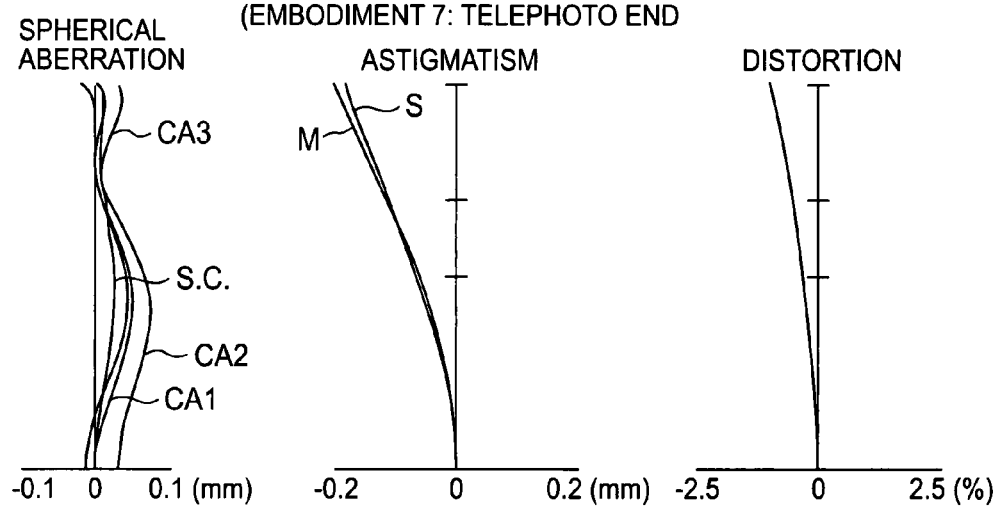
(EMBODIMENT 7: TELEPHOTO END)

ZOOM LENS AND PROJECTOR UNIT

BACKGROUND OF THE INVENTION

The present invention relates to a compact zoom lens having a small lens aperture for enlarging an image from a light valve such as, mainly, a DMD (Digital Micromirror Device) for forming an image by changing a reflecting direction of light and projecting the image so enlarged on to a screen or the like and a projector which installs the zoom lens.

In recent years, DMDs have been put into practical use in which fine micromirrors (mirror elements) are arranged on a plane in such a manner as to correspond to matching pixels and the angles of the respective micromirrors so arranged are mechanically controlled by the use of the micro-machine technology so as to form an image. Since the DMD is characterized in that it has a faster responding speed and can obtain a brighter image than the liquid crystal panel that has been widely used in this field and is, hence, suitable for realizing a portable projector unit which is small in size and which can provide an image which is highly bright and of high quality, the DMD has been propagating quickly.

When the DMD is used as a light valve in a projector unit, there are imposed limitations on a projection lens that is used at the same time, the limitations being specific to the DMD.

A first limitation is in relation to the f number of the projection lens, and this limitation is considered as the largest limitation in developing small projector units. In the current DMDs, the angle at which micromirrors tilt to represent their ON and OFF positions in producing an image is ±12°, and by tilting the micromirrors in that way, reflected lights are switched between valid reflected light (valid light) and invalid reflected light (invalid light). Consequently, in the projector unit which utilizes the DMD as a light valve, it constitutes a condition that the valid light needs to be captured while the invalid light is left not captured, and the f number of the projection lens can be induced from this condition. Namely, f=2.4. In reality, since there exists a demand to take in even more light, a smaller f number is required in many cases while taking into consideration a reduction in contrast within a range which produces no actual damage is caused.

In addition, since the condition like this is established on condition that the position of a pupil of the projection lens which lies on a light valve side thereof is constant, in the event that the pupil position of a zoom lens moves, a loss of light quantity is generated which corresponds to a distance over which the pupil has moved, and therefore, optimizing the pupil position at the wide angle end where brightness generally becomes an issue needs to be taken into consideration.

A second limitation relates to the arrangement of a light source system. Since an image circle of the projection lens is desired to be decreased as much as possible in order to miniaturize the projector unit, the arrangement of an optical system for inputting rays of light for projection into the DMD is limited. In order to allow valid light from the DMD to be inputted into the projection lens, the light source system is to be placed substantially in the same direction as (that is, adjacent to) the projection lens. In addition, a space between a lens element of the projection lens which lies closest to the light valve and the light valve (that is, in general, a back focal length) is used by both optical systems such as a projection system and the light source system. Because of this, a long back focal length has to be provided for the projection lens and at the same time, in order to secure a light guiding space from the light source, the lens system on the light valve side needs to be designed small.

When considering this from the viewpoint of optical design of a projection lens, this constitutes a limitation on design of a projection lens in which the position of a pupil on the light valve side has to be located in the vicinity of the rear of the projection lens. On the other hand, in order to increase the performance of the projection lens, a large number of lenses need to be combined, and in the event that the large number of lenses are arranged, the overall length of the projection lens has to have a certain length. Then, in the event that the overall length of the projection lens becomes long, in a lens in which the position of an entrance pupil lies at the rear thereof, a problem is caused that the size of a forward lens is naturally increased, and this contradicts the miniaturization.

In this way, although there are imposed the large limitations on the development thereof, a projector unit which adopts a DMD as a light valve is regarded as advantageous over other methods in miniaturizing the projector unit. Currently, portable compact projector units have been broadly propagated, and among them, data projectors constitute a center of interest because of its handiness when making presentations. In addition, in order to make compact a projector unit itself, it is natural that there exists a strong desire for miniaturization of a projection lens for use in the projector unit. In parallel with this, there also exists a desire for multi-functional projection lenses. To this end, a performance related to image quality which results from the correction of aberrations has to satisfy sufficiently the specification of the DMD used, and moreover, from the viewpoint of convenience, not only can a variable power based on a zooming configuration be available but also a projection lens having a large image circle has been started to be required in order to adopt a so-called shift configuration in which the center of the DMD is caused to deviate from the optical axis of the projection lens, and as a result, a projection lens having a large angle of view at its wide angle end, as well as a projection lens having a large variable power ratio are now being required.

A projection lens which has been developed to such a specification has a tendency that the aperture of a front group lens becomes larger than required in any ways, which comes to affect largely the thickness dimension of the projector unit. However, it is critical to the projector unit which is developed as a portable one that the thickness dimension is decreased, and this factor can be said to be the most critical to the projector unit which is used in many cases in such a way as to be carried together with a note-type personal computer or the like. As an example of a means for solving this problem, for example, the Japanese Unexamined Patent Publication No. 2004-271668 discloses a design method for making compact a projection lens. In this example, however, an effective aperture of a front lens element when a 0.7-inch DMD is used is in the range of 39 mm to 42 mm, and the thickness of the projector unit cannot be decreased to 50 mm or less. When actually carrying the projector unit with this thickness together with a note-type personal computer, the user has to feel that the relevant thickness is still unsatisfactory.

The invention was made in view of the situations described above, and an aspect thereof is to provide a thin projector unit which is compact and bright, which can project an enlarged image on a large screen with high image quality even in a limited space such as a small conference room and which is convenient when carried by realizing a compact zoom lens which is suitable for characteristics of a light valve such as a DMD which forms an image by changing the reflecting direction light, which has a high image forming performance when applied to enlarge an image from the light valve and project the image so enlarged on to a screen or its substitute such as a wall surface and which has a small lens aperture.

SUMMARY OF THE INVENTION

According to a preferred aspect of the invention, there is provided a zoom lens which is made up of, in order from a magnifying side, a first lens group having a positive or negative refractive power as a whole, a second lens group having a negative refractive power as a whole, and a third lens group having a positive refractive power as a whole.

In this zoom lens, changing the magnification of the whole lens system thereof Is attained by configuring such that the first lens group is left fixed while a magnification varying operation is in effect, the second lens group is made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end.

In addition, in this zoom lens, the following conditional expression (1) is satisfied with respect to a power set at the second lens group, the following conditional expression (2) is satisfied with respect to a power set at the third lens group, and the following conditional expression (3) is satisfied with respect to an airspace set on a contracting side of the third lens group at the wide angle end;

$$-1.1 < f_w/f_{II} < -0.45 \quad (1)$$

$$0.4 < f_w/f_{III} < 0.6 \quad (2)$$

$$1.7 < d_{wIII}/f_w \quad (3)$$

where $f_w$: composite focal length of the whole lens system at the wide angle end (focused at a magnifying side object distance of 1700 mm from a lens surface of the first lens group which is situated closest to the magnifying side);

$f_{II}$: composite focal length of the second lens group;

$f_{III}$: composite focal length of the third lens group;

$d_{wIII}$: airspace between the third lens group and a cover class such as a DMD at the wide angle end.

In addition, another preferred aspect of the invention is to provide a projector unit which installs the zoom lens defined above.

BRIEF DESCRIPTION OF THE DRAWINGS

FIG. 2 is a drawing showing aberrations of the zoom lens of the first embodiment.

FIG. 4 is a drawing showing aberrations of the zoom lens of the second embodiment.

FIG. 6 is a drawing showing aberrations of the zoom lens of the third embodiment.

FIG. 8 is a drawing showing aberrations of the zoom lens of the fourth embodiment.

FIG. 10 is a drawing showing aberrations of the zoom lens of the fifth embodiment.

FIG. 12 is a drawing showing aberrations of the zoom lens of the sixth embodiment.

FIG. 14 is a drawing showing aberrations of the zoom lens of the seventh embodiment.

DETAILED DESCRIPTION OF THE PREFERRED EMBODIMENTS

Figure 1:
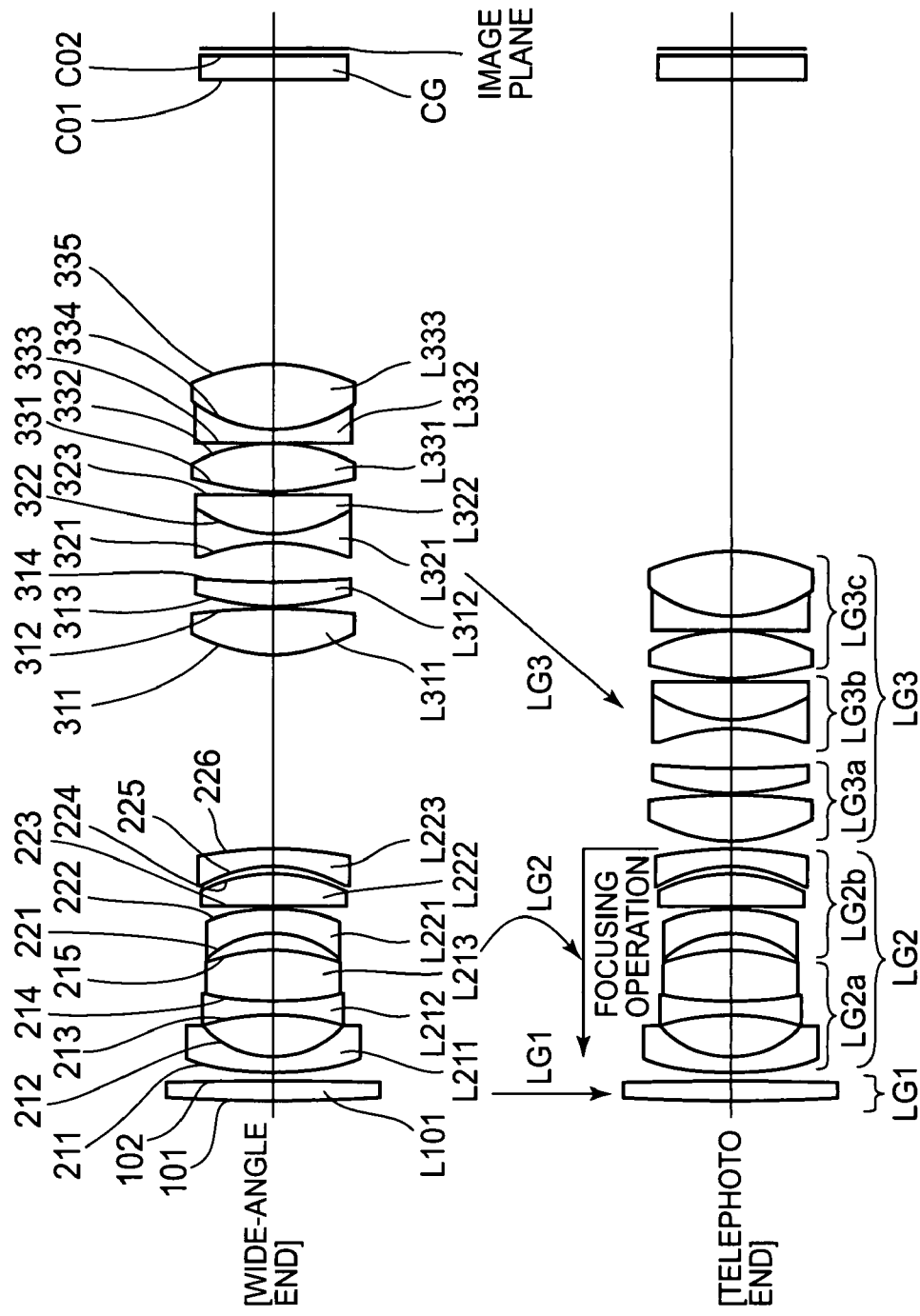
FIG. 1 is a drawing showing a lens configuration of a first embodiment of a zoom lens according to the invention.

Hereinafter, firstly, a zoom lens according to the invention will be described.

This zoom lens is made up of, in order from a magnifying side, a first lens group having a positive or negative refractive cower as a whole, a second lens group having a negative refractive power as a whole, and a third lens group having a positive refractive power as a whole.

In this zoom lens, changing the magnification of the whole lens system thereof is attained by configuring such that the first lens group is left fixed while a magnification varying operation is in effect, the second lens group is made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end.

In addition, in this zoom lens, the following conditional expression (1) is satisfied with respect to a power set at the second lens group, the following conditional expression (2) is satisfied with respect to a power set at the third lens group, and the following conditional expression (3) is satisfied with respect to an airspace set on a contracting side of the third lens group at the wide angle end;

$$-1.1 < f_w/f_{II} < -0.45 \quad (1)$$

$$0.4 < f_w/f_{III} < 0.6 \quad (2)$$

$$1.7 < d_{wIII}/f_w \quad (3)$$

where $f_w$: composite focal length of the whole lens system at the wide angle end (focused at a magnifying side object distance of 1700 mm from a lens surface of the first lens group which is situated closest to the magnifying side)

$f_{II}$: composite focal length of the second lens group;

$f_{III}$: composite focal length of the third lens group;

$d_{wIII}$: airspace between the third lens group and a cover glass such as a DMD at the wide angle end.

The conditional expression (1) represents a condition associated with an appropriate distribution of power to the second lens group which has the negative refractive power as a whole. Namely, this becomes a necessary condition for balancing a condition for properly correcting the size of the whole optical system and aberrations. In addition, a space where an optical system for illuminating the light valve such as the DMD is disposed needs to be secured in an airspace portion defined between the third lens group and the cover glass such as the DMD, and the conditional expression (1) constitutes a critical limitation in securing this space.

Because of this, in the event that a lower limit of the expression is surpassed, the resultant negative power of the second lens group becomes large, and in conjunction with this, the positive power of the third lens group has to be intensified, whereby balancing the aberrations becomes difficult and the performance is deteriorated. On the contrary, in the event that an upper limit of the expression is surpassed, a large airspace has to be defined between the second lens group and the third lens group, whereby the size of the whole optical system becomes large, which contradicts to the aspect of the invention to miniaturize the zoom lens, or no airspace can be secured between the third lens group and the cover glass such as the DMD.

The conditional expression (2) is associated with the third lens group having the strong positive power which governs the variable power (changing the magnification) of the whole lens system by moving along the optical axis direction. In the event that the positive power increases to exceed an upper limit, the moving distance of the third lens group in relation to the variable power can be small, but the balance with the other lens groups is collapsed, whereby the performance is decreased. On the contrary, in the event that a lower limit is surpassed, it is advantageous with respect to aberrations, but the moving distance is increased, and this will do the damage to the miniaturization of the zoom lens.

In addition, the conditional expression (3) is a condition of a space on the contracting side of the third lens group at the wide angle end. This space needs to be secured for the space for the illumination system of the light valve. Consequently, in the event that a lower limit is surpassed, the space for the illumination system becomes insufficient, which makes difficult the design of a projector unit.

Furthermore, the first lens group is made up by disposing a lens element having a positive refractive power (hereinafter, referred to as a positive lens element) or a lens element having a negative refractive power (hereinafter, referred to as a negative lens element), and the following conditional expression (4) is preferably satisfied with respect to a power set at the first lens group:

$$|f_w/f_I|<0.3 \quad (4)$$

where, $f_I$: composite focal length of the first lens group.

While the positive or negative power set at the first lens group which is shown by the conditional expression (4) is relatively small, the positive or negative power so set is such as to finally balance the resultant aberration of the second lens group and succeeding groups bearing the primary power, and in the event that the first lens group has an excessive power which surpasses the power expressed by the conditional expression (4), aberrations are deteriorated due to the first lens group being made up of the single lens element.

Furthermore, the second lens group is made up by disposing, in order from the magnifying side, a second a lens group and a second b lens group. The second a lens group is made up by disposing, in order from the magnifying side, a meniscus negative lens element which is made convex towards the magnifying side, a negative lens element and a positive lens element. Furthermore, the second b lens group has a refracting surface on a side lying closest to the magnifying side which is a surface made heavily concave towards the contracting side and a refracting surface on a side lying closest to the contracting side which is a surface made convex towards the contracting side and is made up by disposing one to three lens elements. Then, the following conditional expression (5) is satisfied with respect to a sewer set at the second a lens group, the following conditional expression (6) is satisfied with respect to a power set at the second b lens group, and the following conditional expression (7) is satisfied with respect to a size of the second lens group on the optical axis:

$$-0.9<f_w/f_{IIa}<-0.2 \quad (5)$$

$$-0.4<f_w/f_{IIb}<0.1 \quad (6)$$

$$1.1<T_{II}/f_w<2.4 \quad (7)$$

where, $f_{IIa}$: composite focal length of the second a lens group which makes up the second lens group;

$f_{IIb}$: composite focal length of the second b lens group which makes up the second lens group;

$T_{II}$: a distance on the optical axis between a magnifying side surface of a lens element of the second lens group which is disposed closest to the magnifying side and a contracting side surface of a lens element of the second lens group which is disposed closest to the contracting side.

The conditional expression (5) and the conditional expression (6) are such as to secure the space where to dispose the illumination system, that is, a portion corresponding to a back focus, which is normally long, under the contradicting conditions of good performance and miniaturization. Because of this, while the second lens group must have a strong negative power, such a negative power is distributed in a way expressed by the conditional expressions (5), (6).

As the contents that are expressed by the respective conditional expressions, the conditional expression (5) relates to the negative power of the second a lens group. In order to extend the back focus, although it is effective to increase the negative power of the second a lens group, in the event that upper and lower limits are surpassed, the negative power of the second b lens group or the second a lens group becomes too large, and a good performance cannot be obtained. Similarly, the conditional expression (6) relates to the negative power of the second b lens group, and in general, it is advantageous that the negative power of the second b lens group is smaller than that of the second a lens group. In the event that upper and lower limits are surpassed, the negative power of the second b lens group or the second a lens group becomes too large, and a good performance cannot be obtained.

The conditional expression (7), which follows the conditional expressions (5), (6), indicates an effective condition to decrease the aperture of, in particular, the lens lying in the vicinity of the front lens element. Rays of light that have emerged from the second lens group are largely diffused due to the strong negative power of the second lens group, and consequently, the aperture of the lens tends to be easily increased. This is prevented by increasing the thickness of the second lens group in a way expressed by the conditional expression (7).

In addition, in order to disperse the negative power of the second lens group, the number of lens elements needs to be increased, and hence, the second lens group inevitably needs to be long to some extent. In the event that a lower limit is surpassed, it becomes difficult to decrease the aperture, whereas in the event that an upper limit is surpassed, a size in the direction of optical axis becomes too large, and it becomes difficult to satisfy the specification. In addition to this, in association with the increase in the number of lens elements, the weight of the second lens group is increased, and this does the damage to the idea of miniaturization.

Furthermore, the following conditional expression (8) is satisfied with respect to a configuration of a contracting side surface of a lens element of the second a lens group which is disposed closest to the magnifying side, the following conditional expression (9) is satisfied with respect to the characteristics of the refractive index of a glass material which is used for each of the lens elements which make up the second a lens group, the following conditional expression (10) is satisfied with respect to the dispersing characteristics of the glass material used for each of the lens elements which make up the second a lens group, and the following conditional expression (11) is satisfied with respect to a configuration of a magnifying side surface of a lens element of the second b lens group which is disposed closest to the magnifying side:

$$0.85 < f_w/r_{IIa2} < 1.6 \tag{8}$$

$$1.65 < N_{IIa\,m} \tag{9}$$

$$V_{IIaP} - V_{IIaN} < -9.0 \tag{10}$$

$$-1.6 < f_w/r_{IIb1} < -0.8 \tag{11}$$

where, $r_{IIa2}$: radius of curvature of the contracting side surface of the lens element of the second a lens group which is disposed closest to the magnifying side;

$r_{IIb1}$: radius of curvature of the magnifying side surface of the lens element of the second b lens group which is disposed closest to the magnifying side;

$N_{IIa}$: mean value of the refractive indexes of the respective lens elements which make up the second a lens group relative to the d line;

$V_{IIaP}$: mean value of Abbe numbers of the respective positive lens elements which make up the second a lens group;

$V_{IIaN}$: mean value of Abbe numbers of the respective negative lens elements which make up the second a lens group.

The conditional expression (8) relates to the configuration of the contracting side surface of the lens element of the second a lens group which is disposed closest to the magnifying side and defines a configuration which is made generally concentric relative to rays of light on the magnifying side and which basically suppresses the generation of aberrations while allowing the relevant lens group to keep the strong power. Consequently, in the event that an upper limit is surpassed, spherical aberration and coma aberration are corrected excessively, whereas in the event that a lower limit is surpassed, those aberrations are corrected insufficiently.

The conditional expression (9) relates to the characteristics of the refractive index of the second a lens group which has the particularly strong negative power. In order to reduce the strength of curvature which results from the acquisition of the strong negative power, the second a lens group must have a high refractive index, and in the event that a lower limit of the conditional expression is surpassed, the spherical aberration and coma aberration become too large because the curvature of the surface becomes too large, and the Petzval sum also becomes too small, thereby making it impossible to obtain a good performance.

The conditional expression (10) is an achromatism condition which constitutes the base of the second lens group and is also a condition for maintaining a good chromatic aberration correction. The conditional expression represents the balance of the dispersion characteristics of the glass material which is used for the second a lens group which is responsible for the large negative power in the second lens group which has the strong negative power, and it is important to suppress the basic chromatic aberration generated in the interior of the lens group to a small level by balancing the dispersion characteristics. By selecting a glass material for these lens elements under the condition expressed by the conditional expression (10), a proper power distribution can be realized, thereby making it possible to correct the chromatic aberration properly. In the event that an upper limit is surpassed, the power of each lens element becomes too large due to the correction of chromatic aberration, and therefore, the aberrations are deteriorated.

The conditional expression (11) is such as to affect the spherical aberration and coma aberration in the second lens group and the effective aperture of the lens element which makes up the first lens group (that is, the aperture of the front lens element). The specification of the zoom lens of this embodiment requires that the angle of view at the wide angle end be wide while the aperture of the front lens element is designed small. Normally, these two conditions are conditions of contradicting natures. In order to decrease the aperture of the front lens element while attaining satisfied corrections of the respective aberrations, it is inevitable that a ray of light which corresponds to an image point where the height of an image becomes high needs to be passed through a position on the first lens group where the height of the ray of light becomes low. It is the lens element of the second b lens group which is disposed closest to the magnifying side that realizes what has just been mentioned in a remarkable way within the second lens group. Although the power given to this lens element is relatively small, the lens element attains its purpose by being formed into the meniscus configuration in which the lens element is made convex largely on the contracting side thereof. On the other hand, a good balance has to be maintained between realization of the small aperture of the front lens element and correction of spherical aberration and coma aberration, and in the event that a lower limit is surpassed, that is, in the event that the radius of curvature becomes too small, the degree of freedom in correction of spherical aberration and coma aberration becomes insufficient, whereas in the event that an upper limit is surpassed, the aperture of the front lens element needs to be increased in order to maintain the good balance, thereby making it impossible to attain the given aspect of miniaturization of the zoom lens.

In addition, at least the magnifying side surface of a lens element of the second a lens group making up the second lens group which is disposed closest to the magnifying side is preferably aspheric, the following conditional expression (12) is preferably satisfied with respect to a power to be set, and the following conditional expression (13) is satisfied with respect to a configuration of a magnifying side surface of a lens element of the second a lens group which Is disposed second closest to the magnifying side:

$$-1.0 < f_w/f_{IIa1} < -0.45 \tag{12}$$

$$-0.7 < f_w/r_{IIa3} < -0.15 \tag{13}$$

where, $f_{IIa1}$: focal length of the lens element making up the second a lens group which is disposed closest to the magnifying side;

$r_{IIa3}$: radius of curvature of the magnifying side surface of the lens element making up the second a lens group which is disposed second closest to the magnifying side.

The conditional expression (12) relates to the power set to the lens element making up the second a lens group which is disposed closest to the magnifying side and affects off-axis aberrations largely. In the event that an upper limit is surpassed, the negative power becomes too small, and a sufficient measure cannot be taken to correct the off-axial aberrations, whereas in the event that a lower limit is surpassed, the negative power becomes too large, and the aberrations including chromatic aberration are deteriorated.

Next, the conditional expression (13) relates to the configuration of the magnifying side surface of the lens element making up the second a lens group which is disposed second closest to the magnifying side and constitutes, together with the conditional expressions (8) and (12), a condition for maintaining the balance of off-axis aberrations from the first lens group to the second a lens group. In the event that an upper limit is surpassed, the radius of curvature of the relevant surface becomes large to reduce the curvature, whereas in the event that a lower limit is surpassed, the curvature thereof becomes large on the contrary. In either of the cases, it becomes difficult to correct chromatic aberration of magnification and distortion which are off-axis aberrations.

In addition, the third lens group is made up by disposing, in order from the magnifying side, a third a lens group, a third b lens group and a third c lens group. The third a lens group is made up by disposing one or two positive lens elements so as to have a positive refractive power as a whole, the third b lens group is made up of one negative lens element or by disposing one negative lens element and one positive lens element so as to have a negative refractive power as a whole, and the third c lens group is made up by disposing two positive lens elements and one negative lens element so as to have a positive refractive power as a whole. In addition, the following conditional expression (14), conditional expression (15) and conditional expression (16) are satisfied with respect to powers set at the third a lens group, third b lens group and third c lens group, respectively, and the following conditional expression (17) is satisfied with respect to the characteristics of the refractive index of a glass material used for each of the positive lens elements which make up the third lens group:

$$0.35 < f_w/f_{IIIa} < 0.8 \quad (14)$$

$$-0.65 < f_w/f_{IIIb} < -0.25 \quad (15)$$

$$0.2 < f_w/f_{IIIc} < 0.5 \quad (16)$$

$$N_{IIIP} < 1.65 \quad (17)$$

where, $f_{IIIa}$: composite focal length of the third a lens group which makes up the third lens group;

$f_{IIIb}$: composite focal length of the third b lens group which makes up the third lens group;

$f_{IIIc}$: composite focal length of the third c lens group which makes up the third lens group;

$N_{IIIP}$: mean value of refractive indexes of the respective positive lens elements which make up the third lens group relative to the line d.

The conditional expression (14) relates to the third a lens group which is disposed on the magnifying side of the third lens group and which has a strong positive power, and is made up of one or two positive lens elements. This conditional expression represents a condition for giving a large positive power so as to receive and make rays of light which are diffused from the second lens group to the third lens group converge and correcting aberrations properly. In the event that an upper limit is surpassed, the positive power becomes too large, whereas in the event that a lower limit is surpassed, on the contrary, the positive power for convergence of the rays of light becomes insufficient. In either of the cases, the spherical aberration and chromatic aberration are largely affected.

The conditional expression (15) relates to the negative power of the third b lens group, and disposing this lens group in combination with the positive powers of the third a and third c lens groups is critical to basically suppress aberrations such as chromatic aberration and field curvature to a low level. In the event that an upper limit is surpassed, since the group powers of the third a lens group and the third c lens group become small as a result of the correction of chromatic aberration, the Petzval sum cannot be decreased. In the event that a lower limit is surpassed, since the third lens group is to be a combination of a strong positive power and a negative power, higher order spherical aberration and coma aberration become excessive.

In addition, the conditional expression (16) is such as to specify the power of the third c lens group. By distributing the positive power of the third lens group as expressed by the conditional expressions (14) and (16), a good performance can be obtained. In the event that an upper limit is surpassed, the power of the third c lens group becomes too large, whereas in the event that a lower limit s surpassed, the power of the third a lens group becomes too large, and in either of the cases, a good performance cannot be obtained.

On the other hand, the conditional expression (17) relates to the refractive index of the positive lens elements of the constituent lens elements and represents a condition which is necessary in correcting field curvature. To realize the miniaturization of the zoom lens, the negative second lens group has the strong negative power, whereby the Petzval sum tends to become easily too small. By suppressing the refractive index of the positive lens elements which make up the third lens group to a low level by the conditional expression (17), a correction is performed while maintaining a good balance. Consequently, in the event that an upper limit is surpassed, the field curvature is corrected excessively.

Furthermore, preferably, the following conditional expression (18) is satisfied with respect to the configuration of a magnifying side surface of a lens element of the third a lens group which is disposed closest to the magnifying side, and the following conditional expression (19) is satisfied with respect to the dispersion characteristics of a glass material which is used for each of the lens elements which make up the third a lens group:

$$0.45 < f_w/r_{IIIa1} < 0.95 \quad (18)$$

$$50 < V_{IIIa} \quad (19)$$

where, $r_{IIIa1}$: radius of curvature of the magnifying side surface of the lens element of the third a lens group which is disposed closest to the magnifying side;

$V_{IIIa}$: mean value of Abbe numbers of the respective lens element which make up the third a lens group.

The conditional expression (18) is a conditional expression for correcting spherical aberration with a good balance. Namely, as to the configuration of the magnifying side surface of the lens element of the third a lens group which is disposed closest to the magnifying side, a configuration is given which has a strong positive power to make rays of light which emerge from the second lens group converge, and as a result of this, a larger under spherical aberration is generated. In conjunction with this, as will be described later on, a large over spherical aberration is generated on the magnifying side surface of the lens element of the third b lens group which is disposed closest to the magnifying side, whereby well-balanced relative constructions result. Consequently, in the event that an upper limit of the conditional expression (18) is surpassed, the under spherical aberration becomes large, whereas in the event that a lower limit is surpassed, the over spherical aberration becomes large.

The conditional expression (19) represents a condition for correcting chromatic aberration. As has been described above, since the third a lens group has the strong positive power, it largely affects chromatic aberration. Consequently, as is expressed by the conditional expression (19), it is inevitable to use a material which has a large Abbe number (that is, small dispersion). In the event that a lower limit is surpassed, the chromatic aberration relative to a short wavelength in the third a lens group becomes large towards the under side, and it becomes difficult to correct the chromatic aberration.

In addition, the following conditional expression (20) is preferably satisfied with respect to the configuration of a magnifying side surface of a lens element of the third b lens group which is disposed closest to the magnifying side:

$$-0.7 < f_w / r_{IIIb1} < -0.25 \quad (20)$$

where, $r_{IIb1}$: radius of curvature of the magnifying side surface of the lens element of the third b lens group which is disposed closest to the magnifying side.

The conditional expression (20) is a conditional expression which corrects spherical aberration with good balance together with the conditional expression (18) as has been described before. The radius of curvature of the magnifying side surface of the lens element of the third b lens group which is disposed closest to the magnifying side is relative to that of the magnifying side surface of the lens element of the third a lens group which is disposed closest to the magnifying side as has been described above, in the event that a lower limit is surpassed in the conditional expression (20), the over spherical aberration becomes large, whereas in the event that an upper limit is surpassed, the under spherical aberration becomes large.

In addition, preferably, the following conditional expression (21) is satisfied with respect to the configuration of a contracting side surface of a lens element of the third c lens group which is disposed closest to the contracting side, and the following conditional expression (22) is satisfied with respect to the dispersion characteristics of a glass material which is used for each of the lens elements which make up the third c lens group:

$$-0.65 < f_w / r_{IIIc5} < -0.3 \quad (21)$$

$$15 < V_{IIIcP} - V_{IIIcN} \quad (22)$$

where, $r_{IIIc5}$: radius of curvature of the contracting side surface of the lens element of the third c lens group which is disposed closest to the contracting side;

$V_{IIIcP}$: mean value of Abbe numbers of the respective positive lens elements which make up the third c lens group;

$V_{IIIcN}$: mean value of Abbe numbers of the respective negative lens elements which make up the third c lens group.

The conditional expression (21) is a conditional expression for correcting the spherical aberration over the whole lens system in an elaborate fashion. The correction is made so as to correct the residual spherical aberration which remains uncorrected by the configurations of the magnifying side surface of the lens element of the third a lens group which is disposed closest to the magnifying side and the magnifying side surface of the lens element of the third b lens group which is disposed closest to the magnifying side, which surfaces are dominant in correction of spherical aberration. In the event that an upper limit is surpassed, an insufficient correction results, and on the contrary, in the event that a lower limit is surpassed, an excessive correction results.

The conditional expression (22) is a condition for correcting color in the third c lens group. In order to correct monochromatic aberration, it is necessary that the power of each lens element does not become too large, and to make this happen, it is a necessary condition that the positive lens element and negative lens element have to have Abbe numbers which satisfy the conditional expression (22). In the event that a lower limit is surpassed, it becomes difficult to correct chromatic aberration.

Furthermore, preferably, the third c lens group includes a partial system constituent element which is made up of at least two lens elements, one negative lens element and one positive lens element, which are cemented together, and the following conditional expression (23) is satisfied with respect to the characteristics of the refractive index of a glass material used for each of the lenses which are cemented together, and the following conditional expression (24) is satisfied similarly with respect to the dispersion characteristics of the glass material used for each of the lens elements which are cemented together:

$$0.25 < N_{IIIcCN} - N_{IIIcCP} \quad (23)$$

$$25 < V_{IIIcCP} - V_{IIIcCN} \quad (24)$$

where, $N_{IIIcCP}$: mean value of the refractive indexes of the positive lens elements of the third c lens group which are disposed in the cemented partial system thereof relative to the line d;

$N_{IIIcCN}$: mean value of the refractive indexes of the negative lens elements of the third c lens group which are disposed in the cemented partial system thereof relative to the line d;

$V_{IIIcCP}$: mean value of Abbe numbers of the positive lens elements of the third c lens group which are disposed in the cemented partial system thereof;

$V_{IIIcCN}$: mean value of Abbe numbers of the negative lens elements of the third c lens group which are disposed in the cemented partial system thereof.

As for arranging methods for the cemented partial system of the third c lens group, when the single positive lens is disposed separately, there are an arranging method for disposing it on the magnifying side and an arranging method for disposing it on the contracting side. In either of the methods, a difference in refractive index is given to the cemented lenses, so as to expect an effect of the correction of field curvature while maintaining the correction capability of spherical aberration at the cemented surface. In the event that a lower limit is surpassed in the conditional expression (23), field curvature is corrected excessively, while spherical aberration is corrected insufficiently. In addition, the conditional expression (24) is a conditional expression relating to the correction of chromatic aberration in the whole lens system, and in the event that a lower limit is surpassed, in particular, the chromatic aberration of magnification is increased.

Thus, by installing the zoom lens of the invention, which is configured in the way that has been described heretofore, in a projector unit, the whole of the projector unit can be miniaturized, thereby making it possible to provide a thin projector unit which is handy when carried.

According to the invention, the zoom lens can be realized which is compact and which has the high image forming performance which is suited to the characteristics of the light valve such as the DMD, and the projector unit can be provided which is compact and which provides an image of high quality.

Hereinafter, the zoom lens of the invention will be described based on specific numerical embodiments. In Embodiments 1 to 7 below, a zoom lens is made up of, in order from the magnifying side, a first lens group LG1 which has a positive or negative refractive power as a whole, a second lens group LG2 which has a negative refractive power as a whole, and a third lens group LG3 which has a positive refractive power as a whole.

In addition, a cover glass CG (having a magnifying side surface C01 and a contracting side surface C02), which is a constituent part of a light valve such as a DMD, is disposed in a large airspace for the illumination system optical path that is provided between the contracting side of the third lens group LG3 and a surface of the light valve.

The second lens group LG2 is made up by disposing, in order from the magnifying side, a second a lens group LG2a and a second b lens group LG2b. The second a lens group LG2a is made up by disposing, in order from the magnifying side, a meniscus negative lens element (designated as L211 and having a magnifying side surface 211 and a contracting side surface 212) which is made convex to the magnifying side, a negative lens element (designated as T212 and having a magnifying side surface 213 and a contracting side surface 214) and a positive lens element (designated as L213 and when cemented, having a magnifying side surface 214 and a contracting surface 215). The second b lens group LG2b, which follows the second a lens group TG2a, has a heavily concaved surface which is made concave towards the contracting side as a refracting surface which is situated closest to the magnifying side and a convex surface which is made convex towards the contracting side as a refracting surface which is situated closest to the contracting side and is made up by disposing one to three lens elements (designated in order from the magnifying side as L221, L222, ... and having lens surfaces designated in order from the magnifying side as 221, 222 ... ).

The third lens group LG3 is made up by disposing, in order from the magnifying side, a third a lens group LG3a, a third b lens group LG3b and a third c lens group LG3c. The third a lens group LG3a has a positive refractive power as a whole and is made up by disposing a total of one or two positive lens elements (designated in order from the magnifying side as L311, L312, and having lens surfaces designated in order from the magnifying side as 311, 312, 313, 314). The third b lens group LG3b has a negative refractive sower as a whole and is made up by disposing a single negative lens element or disposing one negative lens element and one positive lens element (designated in order from the magnifying side as L321, L322 and having surfaces designated in order from the magnifying side as 321, 322, ... ). The third c lens group LG3c has a positive refractive power as a whole and is made up by disposing two positive lens elements and a negative lens element (designated in order from the magnifying side as L331, L332, ... and having surfaces designated in order from the magnifying side as 331, 332, ... ).

In addition, a cover glass CG (having a magnifying side surface C01 and a contracting side surface C02), which is a constituent part of a light valve such as a DMD, is disposed in a large airspace for the illumination system optical path that is provided between the contracting side of the third lens group LG3 and a surface of the light valve.

The second a lens group LG2a and the second b lens group LG2b which make up the second lens group LG2 are fixed to a second lens barrel which is movable, and the third a lens group LG3a, the third b lens group LG3b and the third c lens group LG3c which make up the third lens group LG3 are fixed to a third lens barrel which is movable. In addition, while the magnification is being changed, the first lens group LG1 is fixed, the second lens group LG2 is made to move on the optical axis in a direction from the magnifying side toward the contracting side over a range from a wide angle end to an intermediate area and is made to move on the optical axis in a direction from the contracting side to the magnifying side over a range from the intermediate area to a telephoto end, and the third lens group LG3 is made to move on the optical axis in a direction from the contracting side to the magnifying side over a range from the wide angle end to the telephoto end, whereby changing the magnification of the whole lens system of the zoom lens is attained.

As is known, the configuration of an aspherical surface which is used in each of the embodiments Is defined by a curved surface obtained by rotating about the optical axis a curve given by the following aspherical expression with a Z axis formed in the optical axis direction and a Y axis formed in a direction which intersects the optical axis at right angles:

$$Z=(Y^2/r)/[1+\sqrt{\{1-(1+K)(Y/r)^2\}}]+A\cdot Y^4+B\cdot Y^6+C\cdot Y^8+D\cdot Y^{10}+\ldots$$

where, r: paraxial radius of curvature; K: cone constant; A, B, C, D . . . : higher order aspherical coefficients. Note that in representing the cone constant and higher order aspherical constant in tables, "E and a number following the E" represents a "power of 10". For example, "E-4" means $10^{-4}$, and a numerical value lying directly before this numeric value only has to be multiplied thereby.

Embodiment 1

A numerical example for a first embodiment of a zoom lens of the invention is shown in Table 1. In addition, FIG. 1 is a drawing showing a lens configuration of the first embodiment and FIG. 2 shows drawings illustrating aberrations thereof. In the table and drawings, f denotes a focal length of the whole zoom lens system, $F_{no}$ an f number, and 2ω a total angle of view of the zoom lens. In addition r denotes radius of curvature, d lens thickness or space between lens elements, $n_d$ a refractive index relative to the line d, and $v_d$ Abbe number of the line d (where, numerical values in the table which change by virtue of focusing operation are numerical values which result when an object distance from a surface 101 is 1700 mm in a focused state). CA1, CA2, CA3 in the spherical aberration drawings in the drawings showing aberrations are aberration curves in wavelengths of CA1=550.0 nm, CA2=435.8 nm and CA3=640.0 nm, respectively. In addition, S. C. is a sine condition. In aspherical aberration drawings, S denotes sagital and M denotes meridional. In addition, throughout the tables, unless described specifically, a wavelength used in calculating various values is CA1=550.0 nm.

TABLE 1

|  | Wide angle end | Intermediate area | Telephoto end |
| --- | --- | --- | --- |
| f | 15.89 | 23.82 | 30.70 |
| $F_{no}$ | 2.29 | 2.69 | 3.10 |
| 2ω | 66.08 | 46.11 | 36.47 |

TABLE 1-continued

Hereinafter, airspaces which change by variable power

| | | | |
|---|---|---|---|
| D2 | 1.03 | 4.73 | 1.05 |
| D13 | 24.03 | 8.68 | 1.06 |
| D25 | 34.81 | 46.47 | 57.76 |

| Serial numbers | Surface numbers | r | d | $n_d$ | $\nu_d$ |
|---|---|---|---|---|---|
| 1 | 101 | 188.997 | 2.50 | 1.51680 | 64.20 |
| 2 | 102 | −408.172 | [D2] | — | — |
| 3 | 211 | 85.920 | 2.00 | 1.76802 | 49.24 |
| 4 | 212 | 14.833 | 5.15 | — | — |
| 5 | 213 | −38.800 | 1.80 | 1.80420 | 46.49 |
| 6 | 214 | 54.414 | 6.26 | 1.67270 | 32.17 |
| 7 | 215 | −28.537 | 2.10 | — | — |
| 8 | 221 | −13.906 | 2.94 | 1.80420 | 46.49 |
| 9 | 222 | −29.299 | 0.20 | — | — |
| 10 | 223 | 148.699 | 4.10 | 1.70154 | 41.15 |
| 11 | 224 | −25.648 | 1.00 | — | — |
| 12 | 225 | −21.204 | 2.04 | 1.55920 | 53.90 |
| 13 | 226 | −65.658 | [D13] | — | — |
| 14 | 311 | 25.697 | 5.75 | 1.49700 | 81.61 |
| 15 | 312 | −83.974 | 0.21 | — | — |
| 16 | 313 | 37.525 | 3.04 | 1.49700 | 81.61 |
| 17 | 314 | 135.601 | 4.79 | — | — |
| 18 | 321 | −33.085 | 1.13 | 1.80420 | 46.49 |
| 19 | 322 | 21.363 | 4.99 | 1.58913 | 61.25 |
| 20 | 323 | −95.528 | 0.20 | — | — |
| 21 | 331 | 38.116 | 6.07 | 1.54072 | 47.18 |
| 22 | 332 | −27.327 | 0.20 | — | — |
| 23 | 333 | −133.089 | 1.64 | 1.80610 | 40.73 |
| 24 | 334 | 20.534 | 8.08 | 1.48749 | 70.45 |
| 25 | 335 | −29.430 | [D25] | — | — |
| 26 | C01 | ∞ | 3.00 | 1.48745 | 64.84 |
| 27 | C02 | ∞ | — | — | — |

Aspherical coefficient

211th surface

K = −1.21455E+02
A = 5.87331E−05
B = −2.41153E−07
C = 1.95854E−09
D = −9.59617E−12
E = 2.58817E−14

323rd surface

K = −3.80909E+01
A = 2.22343E−05
B = 2.41117E−08
C = −4.79864E−11

Embodiment 2

Figure 3:
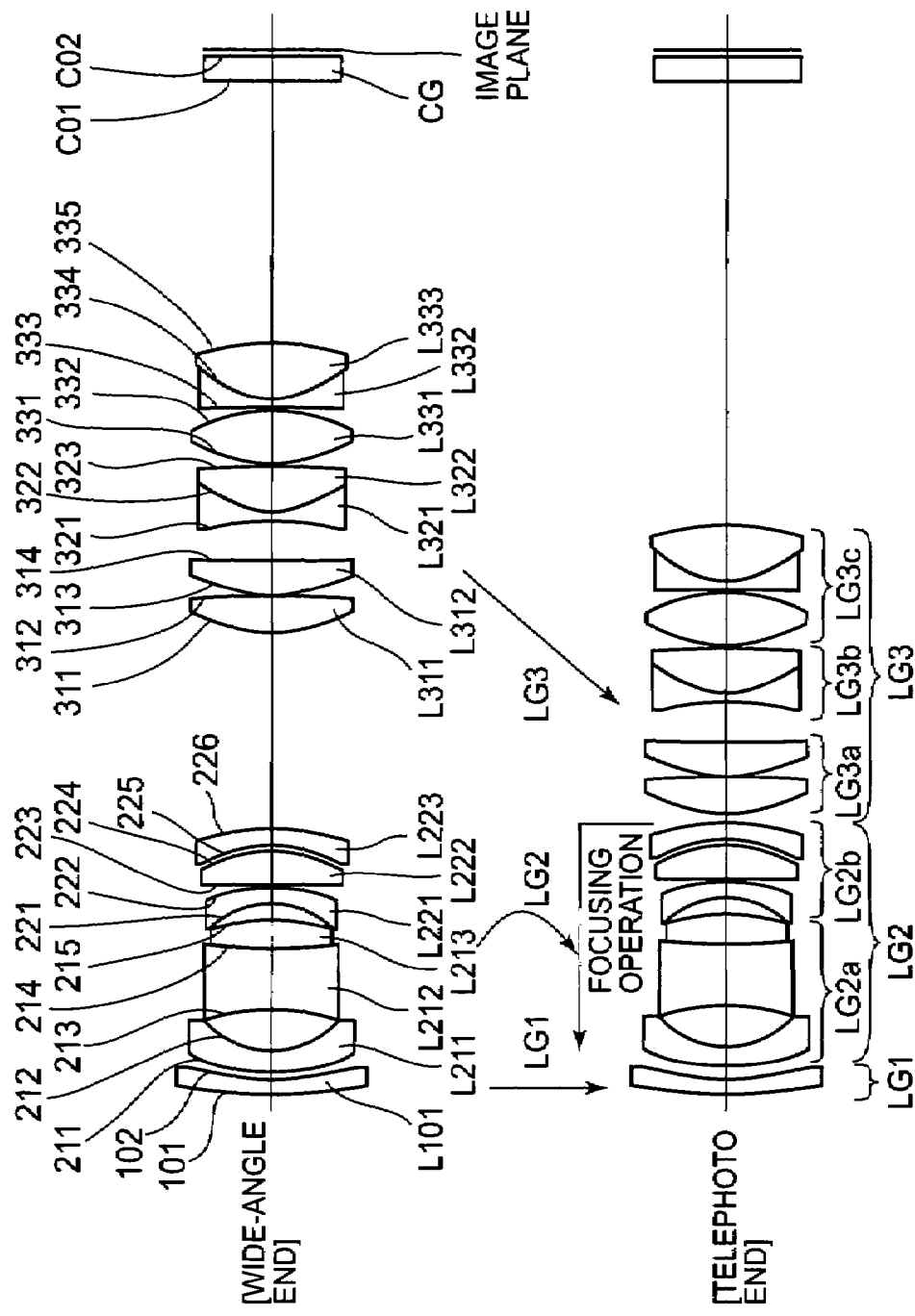
FIG. 3 is a drawing showing a lens configuration of a second embodiment of a zoom lens according to the invention.

A numerical example for a second embodiment of a zoom lens of the invention is shown in Table 2. In addition, FIG. 3 is a drawing showing a lens configuration of the second embodiment and FIG. 4 shows drawings illustrating aberrations thereof.

TABLE 2

| | Wide angle end | Intermediate area | Telephoto end |
|---|---|---|---|
| f | 15.93 | 23.91 | 30.76 |
| $F_{no}$ | 2.29 | 2.77 | 3.15 |
| 2ω | 65.94 | 46.14 | 36.35 |

Hereinafter, airspaces which change by variable power

| | | | |
|---|---|---|---|
| D2 | 1.02 | 5.24 | 1.87 |
| D13 | 25.28 | 8.02 | 1.07 |
| D25 | 34.00 | 47.03 | 57.35 |

TABLE 2-continued

| Serial numbers | Surface numbers | r | d | $n_d$ | $\nu_d$ |
|---|---|---|---|---|---|
| 1 | 101 | 71.939 | 2.00 | 1.71300 | 53.93 |
| 2 | 102 | 50.000 | [D2] | — | — |
| 3 | 211 | 61.853 | 2.54 | 1.74330 | 49.33 |
| 4 | 212 | 15.065 | 5.34 | — | — |
| 5 | 213 | −36.392 | 8.05 | 1.77250 | 49.65 |
| 6 | 214 | 96.497 | 3.69 | 1.72342 | 37.99 |
| 7 | 215 | −32.833 | 2.08 | — | — |
| 8 | 221 | −14.251 | 2.00 | 1.77250 | 49.65 |
| 9 | 222 | −31.192 | 0.20 | — | — |
| 10 | 223 | 266.513 | 4.55 | 1.70154 | 41.15 |
| 11 | 224 | −21.367 | 0.72 | — | — |
| 12 | 225 | −19.951 | 2.00 | 1.69680 | 55.48 |
| 13 | 226 | −45.206 | [D13] | — | — |
| 14 | 311 | 30.009 | 4.79 | 1.49700 | 81.61 |
| 15 | 312 | −251.076 | 0.20 | — | — |
| 16 | 313 | 28.787 | 4.50 | 1.48749 | 70.45 |
| 17 | 314 | −517.469 | 5.01 | — | — |
| 18 | 321 | −41.735 | 1.00 | 1.80420 | 46.49 |
| 19 | 322 | 17.162 | 5.92 | 1.51760 | 63.50 |
| 20 | 323 | −118.068 | 0.30 | — | — |
| 21 | 331 | 29.562 | 6.96 | 1.51823 | 58.96 |
| 22 | 332 | −26.876 | 0.20 | — | — |
| 23 | 333 | −530.464 | 1.20 | 1.80420 | 46.49 |
| 24 | 334 | 16.748 | 7.13 | 1.48749 | 70.45 |
| 25 | 335 | −43.293 | [D25] | — | — |
| 26 | C01 | ∞ | 3.00 | 1.48745 | 64.84 |
| 27 | C02 | ∞ | — | — | — |

Aspherical coefficient

211th surface

K = −5.46543E+01
A = 6.81597E−05
B = −2.47163E−07
C = 1.98221E−09
D = −9.10846E−12
E = 2.40978E−14

323rd surface

K = −1.62566E+02
A = 1.10932E−05
B = 5.15512E−08
C = −1.32843E−10

Embodiment 3

Figure 5:
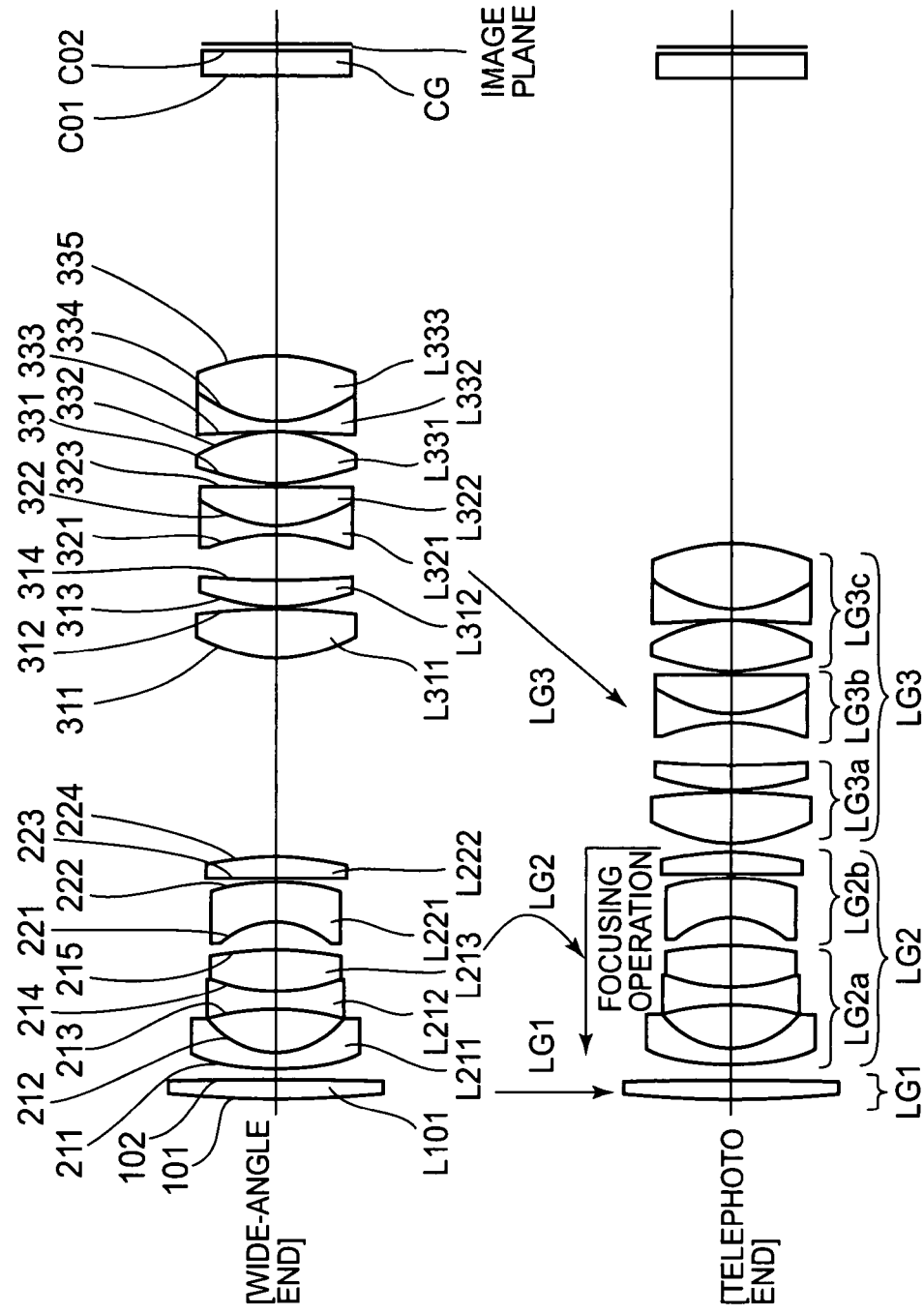
FIG. 5 is a drawing showing a lens configuration of a third embodiment of a zoom lens according to the invention.

A numerical example for a third embodiments of a zoom lens of the invention is shown in Table 3. In addition, FIG. 5 is a drawing showing a lens configuration of the third embodiment and FIG. 6 shows drawings illustrating aberrations thereof.

TABLE 3

| | Wide angle end | Intermediate area | Telephoto end |
|---|---|---|---|
| f | 15.89 | 23.86 | 30.71 |
| $F_{no}$ | 2.29 | 2.68 | 3.10 |
| 2ω | 65.98 | 45.91 | 36.43 |

Hereinafter, airspaces which change by variable power

| | | | |
|---|---|---|---|
| D2 | 1.05 | 5.13 | 1.63 |
| D11 | 24.74 | 8.95 | 1.07 |
| D23 | 34.70 | 46.40 | 57.79 |

| Serial numbers | Surface numbers | r | d | $n_d$ | $\nu_d$ |
|---|---|---|---|---|---|
| 1 | 101 | 168.060 | 2.50 | 1.51680 | 64.20 |
| 2 | 102 | −347.731 | [D2] | — | — |
| 3 | 211 | 72.595 | 2.00 | 1.80610 | 40.73 |
| 4 | 212 | 14.002 | 5.40 | — | — |

TABLE 3-continued

| | | | | | |
|---|---|---|---|---|---|
| 5 | 213 | −59.301 | 2.20 | 1.77250 | 49.65 |
| 6 | 214 | 27.370 | 5.14 | 1.71736 | 29.50 |
| 7 | 215 | −42.288 | 3.37 | — | — |
| 8 | 221 | −14.769 | 5.02 | 1.80420 | 46.49 |
| 9 | 222 | −34.236 | 0.20 | — | — |
| 10 | 223 | 430.013 | 2.81 | 1.72342 | 37.99 |
| 11 | 224 | −54.157 | [D11] | — | — |
| 12 | 311 | 26.180 | 6.02 | 1.49700 | 81.61 |
| 13 | 312 | −102.970 | 0.49 | — | — |
| 14 | 313 | 38.129 | 3.15 | 1.49700 | 81.61 |
| 15 | 314 | 175.970 | 5.59 | — | — |
| 16 | 321 | −32.924 | 1.01 | 1.80420 | 46.49 |
| 17 | 322 | 22.036 | 4.75 | 1.58313 | 59.46 |
| 18 | 323 | −116.732 | 0.63 | — | — |
| 19 | 331 | 37.434 | 6.19 | 1.58913 | 61.25 |
| 20 | 332 | −27.472 | 0.20 | — | — |
| 21 | 333 | −126.349 | 1.20 | 1.80420 | 46.49 |
| 22 | 334 | 19.999 | 7.97 | 1.48749 | 70.45 |
| 23 | 335 | −31.455 | [D23] | — | — |
| 24 | C01 | ∞ | 3.00 | 1.48745 | 64.84 |
| 25 | C02 | ∞ | — | — | — |

Aspherical coefficient

211th surface

K = −4.05230E+01
A = 4.15298E−05
B = −1.11255E−07
C = 5.94250E−10
D = −1.91685E−12
E = 3.39854E−15

323rd surface

K = −2.33484E+01
A = 2.78980E−05
B = 1.99246E−08
C = −6.61347E−12

Embodiment 4

Figure 7:
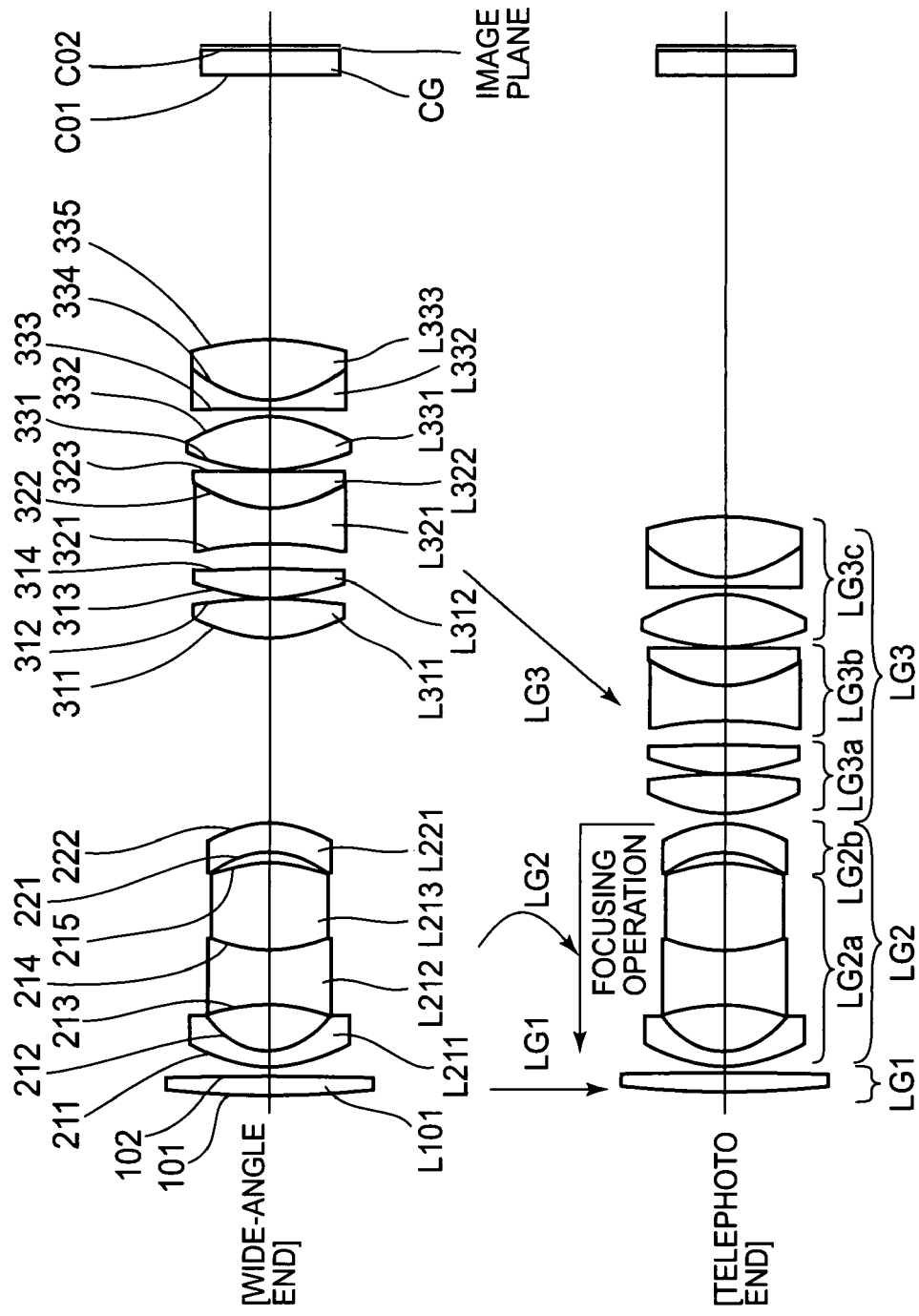
FIG. 7 is a drawing showing a lens configuration of a fourth embodiment of a zoom lens according to the invention.

A numerical example for a fourth embodiment of a zoom lens of the invention is shown in Table 4. In addition, FIG. 7 is a drawing showing a lens configuration of the fourth embodiment and FIG. 8 shows drawings illustrating aberrations thereof.

TABLE 4

| | Wide angle end | Intermediate area | Telephoto end | | |
|---|---|---|---|---|---|
| f | 15.89 | 23.85 | 30.71 | | |
| $F_{no}$ | 2.29 | 2.70 | 3.40 | | |
| 2ω | 65.94 | 45.90 | 36.39 | | |
| Hereinafter, airspaces which change by variable power | | | | | |
| D2 | 1.04 | 4.75 | 1.03 | | |
| D9 | 24.21 | 8.74 | 1.06 | | |
| D21 | 34.00 | 45.76 | 57.15 | | |

| Serial numbers | Surface numbers | r | d | $n_d$ | $v_d$ |
|---|---|---|---|---|---|
| 1 | 101 | 151.594 | 2.54 | 1.48749 | 70.45 |
| 2 | 102 | −499.017 | [D2] | — | — |
| 3 | 211 | 30.039 | 2.00 | 1.80139 | 45.45 |
| 4 | 212 | 12.514 | 6.20 | — | — |
| 5 | 213 | −29.641 | 6.99 | 1.80100 | 34.97 |
| 6 | 214 | 24.636 | 11.43 | 1.75520 | 27.52 |
| 7 | 215 | −28.577 | 1.53 | — | — |
| 8 | 221 | −14.973 | 3.50 | 1.80139 | 45.45 |
| 9 | 222 | −23.624 | [D9] | — | — |
| 10 | 311 | 29.684 | 4.91 | 1.48749 | 70.45 |
| 11 | 312 | −113.199 | 0.20 | — | — |
| 12 | 313 | 37.486 | 3.78 | 1.49700 | 81.61 |

TABLE 4-continued

| | | | | | |
|---|---|---|---|---|---|
| 13 | 314 | −363.941 | 3.55 | — | — |
| 14 | 321 | −40.014 | 4.44 | 1.77250 | 49.65 |
| 15 | 322 | 22.765 | 4.79 | 1.50670 | 70.50 |
| 16 | 323 | −167.955 | 0.20 | — | — |
| 17 | 331 | 35.390 | 6.79 | 1.48749 | 70.45 |
| 18 | 332 | −26.441 | 1.19 | — | — |
| 19 | 333 | 979.708 | 1.20 | 1.80420 | 46.49 |
| 20 | 334 | 19.704 | 7.71 | 1.48749 | 70.45 |
| 21 | 335 | −45.079 | [D21] | — | — |
| 22 | C01 | ∞ | 3.00 | 1.48736 | 64.84 |
| 23 | C02 | ∞ | — | — | — |

Aspherical coefficient

211th surface

K = −5.37020E+00
A = 4.32741E−05
B = −6.68948E−08
C = 6.87975E−10
D = −3.55397E−12
E = 1.18517E−14

222nd surface

K = 0
A = −8.05874E−06
B = −2.48952E−08
C = 5.08120E−11
D = −4.41644E−13

323rd surface

K = 1.14638E+02
A = 2.88199E−05
B = 1.66005E−08
C = 4.17357E−11

Embodiment 5

Figure 9:
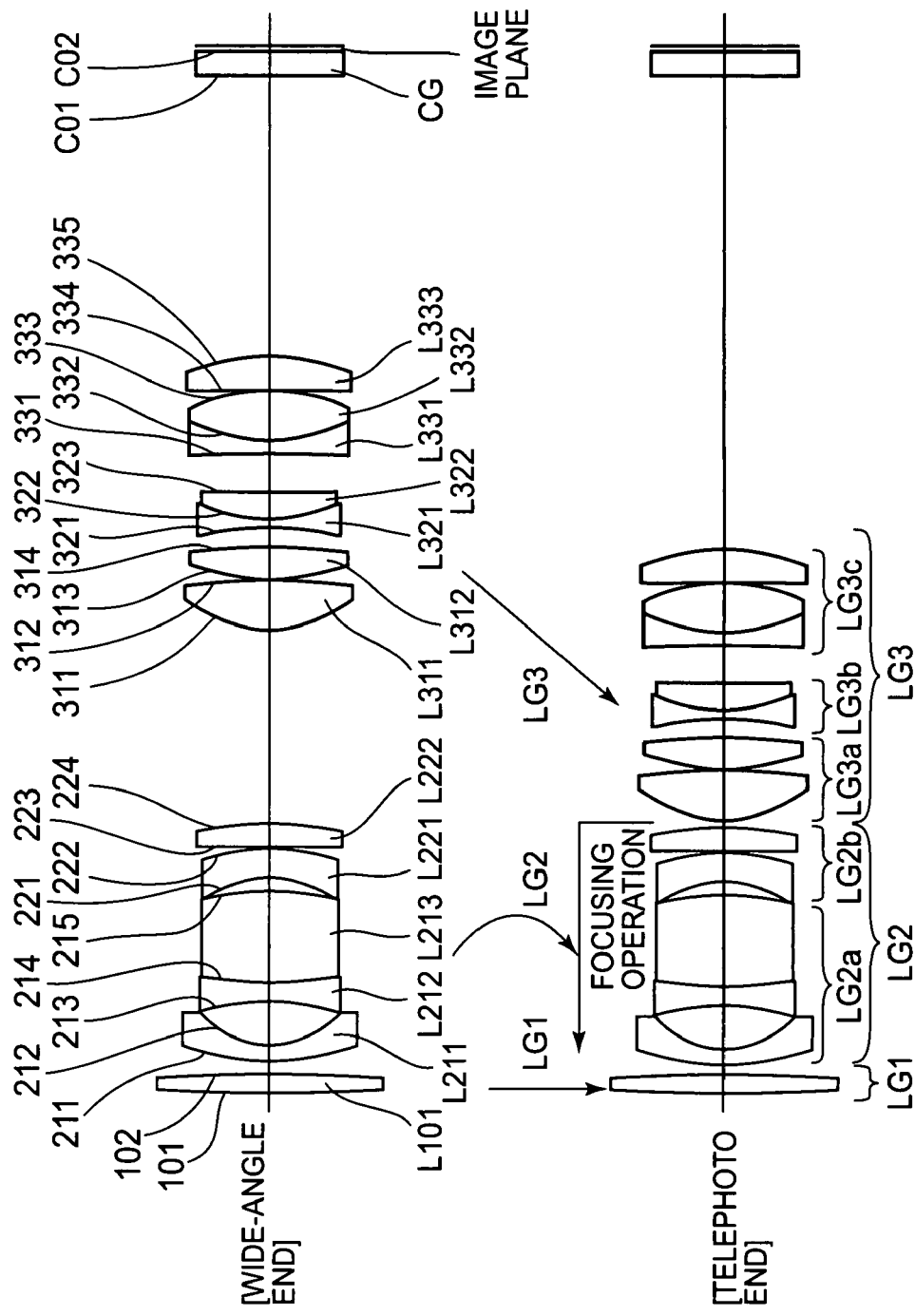
FIG. 9 is a drawing showing a lens configuration of a fifth embodiment of a zoom lens according to the invention.

A numerical example for a fifth embodiment of a zoom lens of the invention is shown in Table 5. In addition, FIG. 9 is a drawing showing a lens configuration of the fifth embodiment and FIG. 10 shows drawings illustrating aberrations thereof.

TABLE 5

| | Wide angle end | Intermediate area | Telephoto end | | |
|---|---|---|---|---|---|
| f | 15.89 | 23.88 | 30.70 | | |
| $F_{no}$ | 2.29 | 2.79 | 3.28 | | |
| 2ω | 66.04 | 45.92 | 36.51 | | |
| Hereinafter, airspaces which change by variable power | | | | | |
| D2 | 1.63 | 4.99 | 1.02 | | |
| D11 | 23.77 | 8.59 | 1.05 | | |
| D23 | 34.01 | 45.83 | 57.33 | | |

| Serial numbers | Surface numbers | r | d | $n_d$ | $v_d$ |
|---|---|---|---|---|---|
| 1 | 101 | 246.129 | 2.44 | 1.51680 | 64.20 |
| 2 | 102 | −202.205 | [D2] | — | — |
| 3 | 211 | 58.275 | 2.01 | 1.80610 | 40.73 |
| 4 | 212 | 14.052 | 5.12 | — | — |
| 5 | 213 | −45.823 | 2.31 | 1.80420 | 46.49 |
| 6 | 214 | 51.408 | 11.06 | 1.75211 | 25.05 |
| 7 | 215 | −44.515 | 1.79 | — | — |
| 8 | 221 | −15.921 | 3.22 | 1.80420 | 46.49 |
| 9 | 222 | −35.476 | 0.25 | — | — |
| 10 | 223 | 289.650 | 3.00 | 1.60342 | 38.00 |
| 11 | 224 | −50.668 | [D11] | — | — |
| 12 | 311 | 20.681 | 6.00 | 1.48749 | 70.45 |
| 13 | 312 | −150.679 | 0.23 | — | — |
| 14 | 313 | 36.631 | 3.92 | 1.49700 | 81.61 |
| 15 | 314 | −112.554 | 2.06 | — | — |
| 16 | 321 | −50.572 | 1.20 | 1.79950 | 42.35 |
| 17 | 322 | 32.212 | 3.11 | 1.54250 | 62.90 |

TABLE 5-continued

| | | | | | |
|---|---|---|---|---|---|
| 18 | 323 | −313.756 | 4.81 | — | — |
| 19 | 331 | −124.163 | 1.36 | 1.78590 | 43.93 |
| 20 | 332 | 26.121 | 5.98 | 1.48749 | 70.45 |
| 21 | 333 | −32.159 | 0.20 | — | — |
| 22 | 334 | −354.800 | 4.10 | 1.49700 | 81.61 |
| 23 | 335 | −29.207 | [D23] | — | — |
| 24 | C01 | ∞ | 3.00 | 1.48745 | 64.84 |
| 25 | C02 | ∞ | — | — | — |

Aspherical coefficient

211th surface

K = −2.23499E+01
A = 3.75794E−05
B = −9.27548E−08
C = 5.35782E−10
D = −1.97311E−12
E = 4.00087E−15

323rd surface

K = −4.63244E+01
A = 4.65016E−05
B = 2.39299E−08
C = 2.66882E−10

Embodiment 6

Figure 11:
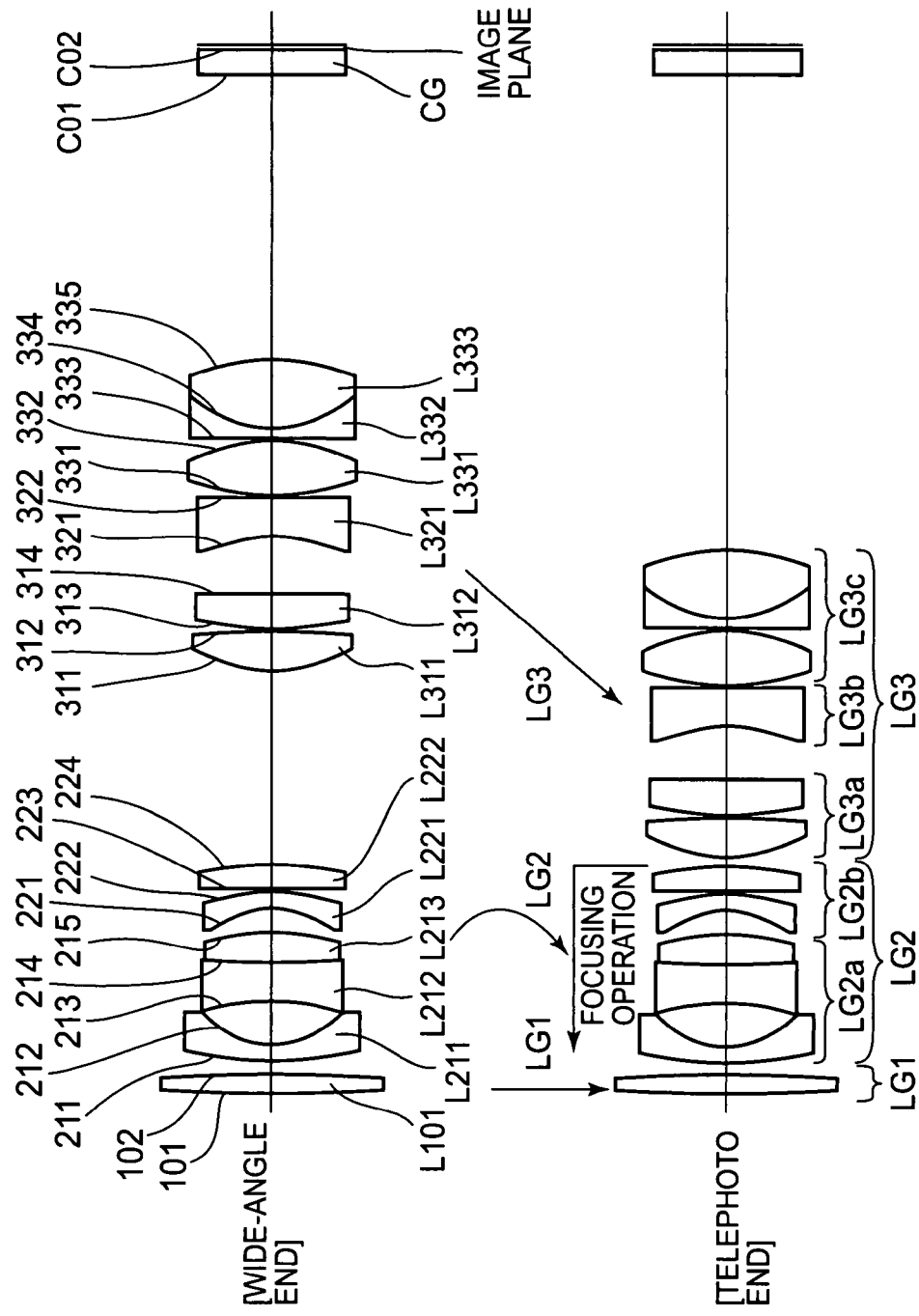
FIG. 11 is a drawing showing a lens configuration of a sixth embodiment of a zoom lens according to the invention.

A numerical example for a sixth embodiment of a zoom lens of the invention is shown in Table 6. In addition, FIG. 11 is a drawing showing a lens configuration of the sixth embodiment and FIG. 12 shows drawings illustrating aberrations thereof.

TABLE 6

| | Wide angle end | Intermediate area | Telephoto end | | |
|---|---|---|---|---|---|
| f | 15.89 | 23.86 | 30.68 | | |
| $F_{no}$ | 2.29 | 2.77 | 3.25 | | |
| 2ω | 66.07 | 45.98 | 36.50 | | |
| Hereinafter, airspaces which change by variable power | | | | | |
| D2 | 1.41 | 4.86 | 1.05 | | |
| D11 | 23.53 | 8.52 | 1.06 | | |
| D22 | 34.00 | 45.57 | 56.83 | | |

| Serial numbers | Surface numbers | r | d | $n_d$ | $\nu_d$ |
|---|---|---|---|---|---|
| 1 | 101 | 159.321 | 2.58 | 1.48748 | 70.45 |
| 2 | 102 | −294.640 | [D2] | — | — |
| 3 | 211 | 96.008 | 2.00 | 1.80610 | 40.73 |
| 4 | 212 | 14.055 | 5.28 | — | — |
| 5 | 213 | −42.847 | 4.71 | 1.69680 | 55.48 |
| 6 | 214 | 165.915 | 3.61 | 1.69895 | 30.05 |
| 7 | 215 | −37.838 | 3.02 | — | — |
| 8 | 221 | −14.728 | 2.02 | 1.80420 | 46.49 |
| 9 | 222 | −30.252 | 0.22 | — | — |
| 10 | 223 | 468.159 | 3.07 | 1.72825 | 28.31 |
| 11 | 224 | −49.101 | [D11] | — | — |
| 12 | 311 | 28.138 | 4.71 | 1.49700 | 81.61 |
| 13 | 312 | −121.549 | 0.22 | — | — |
| 14 | 313 | 64.515 | 4.00 | 1.48749 | 70.45 |
| 15 | 314 | 737.958 | 7.01 | — | — |
| 16 | 321 | −27.173 | 4.93 | 1.76802 | 49.24 |
| 17 | 322 | −109.789 | 0.22 | — | — |
| 18 | 331 | 37.639 | 6.74 | 1.49700 | 81.61 |
| 19 | 332 | −24.100 | 0.21 | — | — |
| 20 | 333 | 434.670 | 1.20 | 1.80610 | 40.73 |
| 21 | 334 | 18.483 | 8.03 | 1.48749 | 70.45 |
| 22 | 335 | −40.181 | [D22] | — | — |
| 23 | C01 | ∞ | 3.00 | 1.48745 | 64.84 |
| 24 | C02 | ∞ | — | — | — |

TABLE 6-continued

Aspherical coefficient

211th surface

K = −3.53015E+01
A = 3.57864E−05
B = −7.50028E−08
C = 3.57084E−10
D = −9.77817E−13
E = 1.98734E−15

322nd surface

K = −6.77657E+01
A = 1.85843E−05
B = 3.06965E−08
C = 2.03862E−12

Embodiment 7

Figure 13:
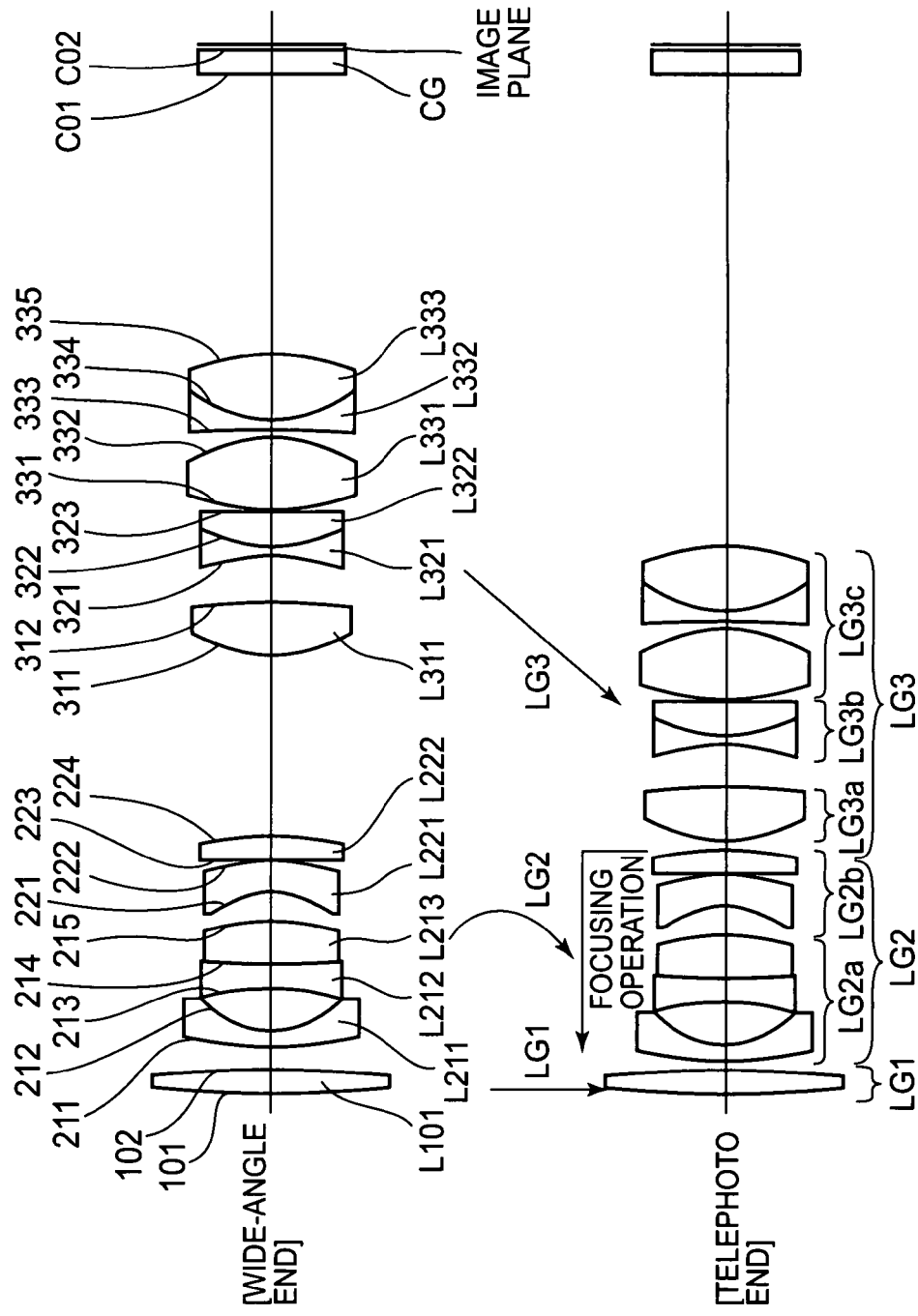
FIG. 13 is a drawing showing a lens configuration of a seventh embodiment of a zoom lens according to the invention.

A numerical example for a seventh embodiment of a zoom lens of the invention is shown in Table 7. In addition, FIG. 13 is a drawing showing a lens configuration of the seventh embodiment and FIG. 14 shows drawings illustrating aberrations thereof.

TABLE 7

| | Wide angle end | Intermediate area | Telephoto end | | |
|---|---|---|---|---|---|
| f | 15.89 | 23.84 | 30.71 | | |
| $F_{no}$ | 2.29 | 2.80 | 3.29 | | |
| 2ω | 66.04 | 46.11 | 36.51 | | |
| Hereinafter, airspaces which change by variable power | | | | | |
| D2 | 2.64 | 5.29 | 1.01 | | |
| D11 | 22.43 | 8.11 | 1.04 | | |
| D21 | 34.00 | 45.67 | 57.02 | | |

| Serial numbers | Surface numbers | r | d | $n_d$ | $\nu_d$ |
|---|---|---|---|---|---|
| 1 | 101 | 188.331 | 2.65 | 1.48749 | 70.45 |
| 2 | 102 | −303.496 | [D2] | — | — |
| 3 | 211 | 81.638 | 2.00 | 1.80139 | 45.45 |
| 4 | 212 | 14.261 | 4.85 | — | — |
| 5 | 213 | −64.747 | 2.93 | 1.80420 | 46.49 |
| 6 | 214 | 79.411 | 5.20 | 1.67270 | 32.17 |
| 7 | 215 | −36.887 | 3.38 | — | — |
| 8 | 221 | −15.018 | 3.87 | 1.80420 | 46.49 |
| 9 | 222 | −34.920 | 0.20 | — | — |
| 10 | 223 | 276.839 | 2.57 | 1.80518 | 25.46 |
| 11 | 224 | −73.119 | [D11] | — | — |
| 12 | 311 | 26.967 | 6.41 | 1.60311 | 60.74 |
| 13 | 312 | −74.875 | 5.64 | — | — |
| 14 | 321 | −31.408 | 1.00 | 1.78590 | 43.93 |
| 15 | 322 | 25.349 | 4.20 | 1.66955 | 55.40 |
| 16 | 323 | −84.413 | 0.20 | — | — |
| 17 | 331 | 35.735 | 8.45 | 1.49700 | 81.61 |
| 18 | 332 | −24.084 | 1.15 | — | — |
| 19 | 333 | −309.498 | 1.20 | 1.80420 | 46.49 |
| 20 | 334 | 19.100 | 7.84 | 1.48749 | 70.45 |
| 21 | 335 | −34.234 | [D21] | — | — |
| 22 | C01 | ∞ | 3.00 | 1.48745 | 64.84 |
| 23 | C02 | ∞ | — | — | — |

Aspherical coefficient

211th surface

K = −4.52301E+01
A = 3.79673E−05
B = −8.75838E−08
C = 4.16658E−10
D = −1.13312E−12
E = 1.88606E−15

TABLE 7-continued

| 323rd surface | |
|---|---|
| K = | −7.42508E+01 |
| A = | 1.47626E−05 |
| B = | 8.87203E−08 |
| C = | −9.89350E−11 |

Next, with respect to Embodiments 1 to 7, values corresponding to the conditional expressions (1) to (24) are shown altogether in Table 8.

Figure 15:
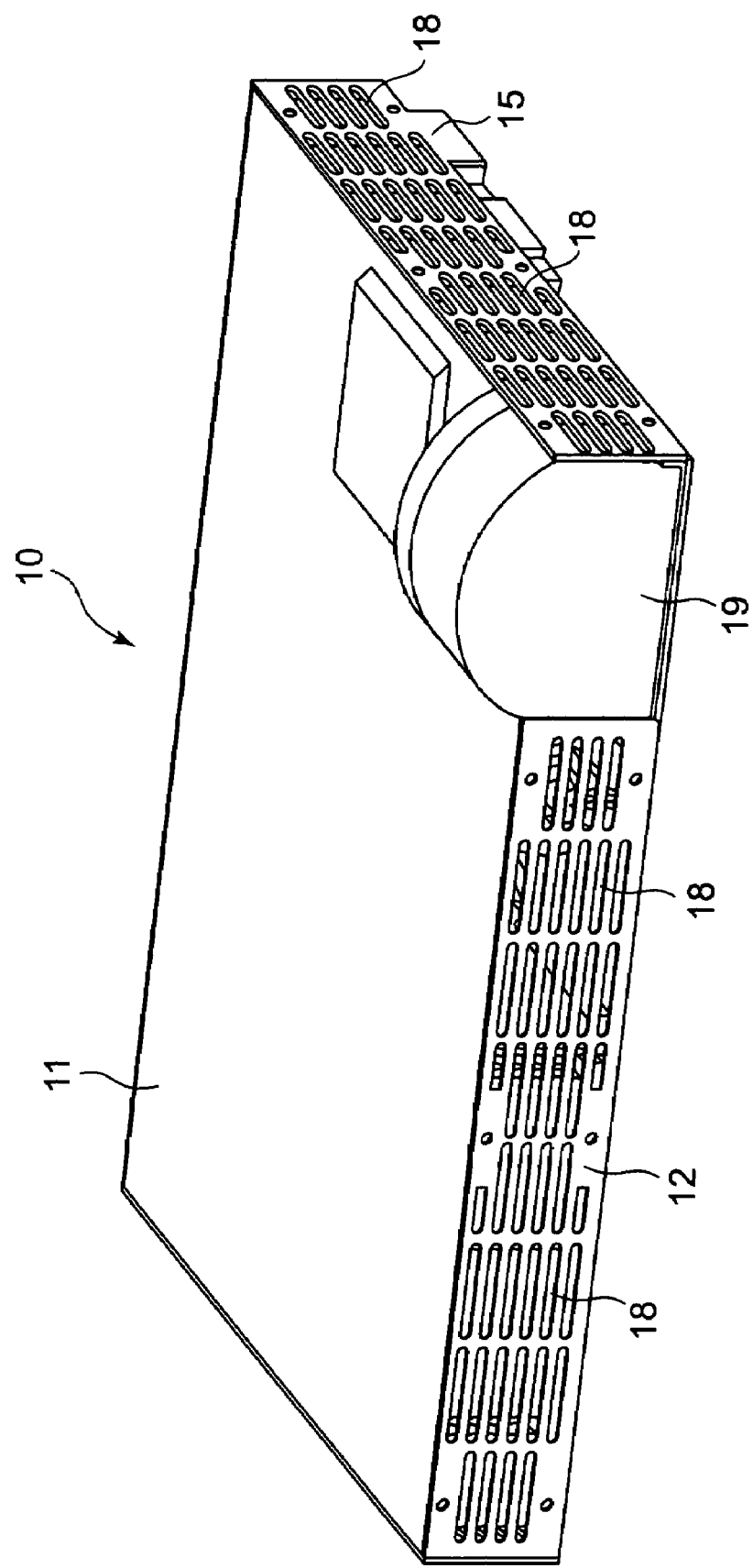
FIG. 15 is a drawing showing an external appearance of a projector unit according to the invention.

In addition, a plurality of vent holes 18 are provided, respectively, on a right-side panel, not shown, which is a side panel of the main body case and a left-side panel 15 which is a side panel shown in FIG. 15.

The zoom lens that has been described above is installed in such a manner as to face the projection port in the projector which is covered by the lens cover 19.

Figure 16:
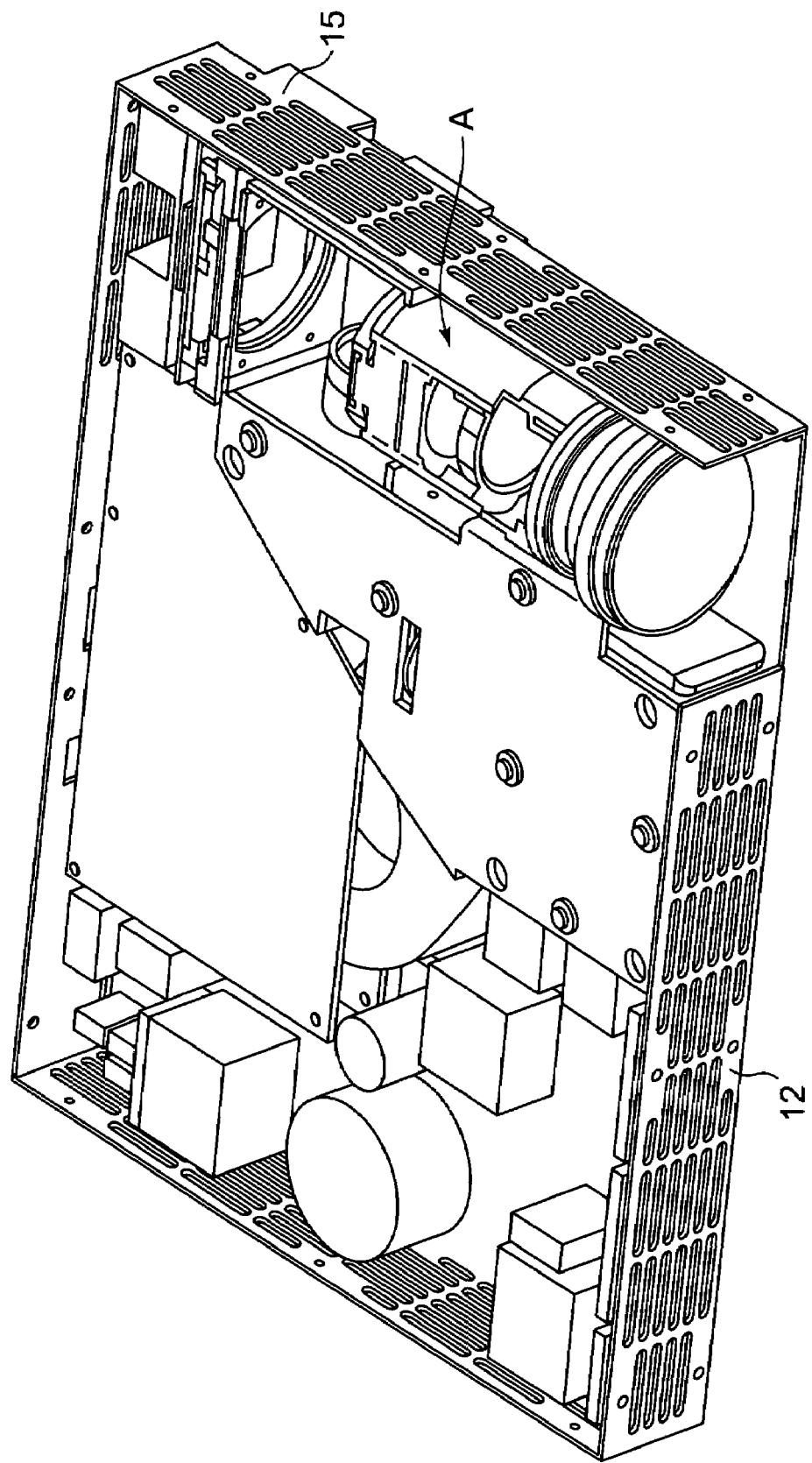
FIG. 16 is a drawing showing exemplarily a state in which a top panel of the projector unit according to the invention is removed.

In addition, a state resulting when the top panel 11 of the projector 10 is removed is as shown in FIG. 16. Although a detailed description is omitted, the zoom lens A is disposed in a position which extends along the left-side panel 15.

TABLE 8

| | Embodiment 1 | Embodiment 2 | Embodiment 3 | Embodiment 4 | Embodiment 5 | Embodiment 6 | Embodiment 7 |
|---|---|---|---|---|---|---|---|
| Conditional expression (1) | −0.78 | −0.64 | −0.78 | −0.79 | −0.81 | −0.80 | −0.82 |
| Conditional expression (2) | 0.47 | 0.46 | 0.46 | 0.46 | 0.47 | 0.48 | 0.49 |
| Conditional expression (3) | 2.19 | 2.13 | 2.18 | 2.14 | 2.14 | 2.14 | 2.14 |
| Conditional expression (4) | 0.06 | −0.07 | 0.07 | 0.07 | 0.07 | 0.07 | 0.07 |
| Conditional expression (5) | −0.54 | −0.43 | −0.62 | −0.31 | −0.58 | −0.63 | −0.57 |
| Conditional expression (6) | −0.18 | −0.15 | −0.15 | −0.26 | −0.16 | −0.13 | −0.19 |
| Conditional expression (7) | 1.74 | 1.96 | 1.64 | 1.99 | 1.81 | 1.51 | 1.57 |
| Conditional expression (8) | 1.07 | 1.06 | 1.13 | 1.27 | 1.13 | 1.13 | 1.11 |
| Conditional expression (9) | 1.75 | 1.75 | 1.77 | 1.79 | 1.79 | 1.73 | 1.76 |
| Conditional expression (10) | −15.70 | −11.50 | −15.69 | −12.69 | −18.56 | −18.06 | −13.80 |
| Conditional expression (11) | −1.14 | −1.12 | −1.08 | −1.06 | −1.00 | −1.08 | −1.06 |
| Conditional expression (12) | −0.68 | −0.58 | −0.73 | −0.57 | −0.68 | −0.77 | −0.73 |
| Conditional expression (13) | −0.41 | −0.44 | −0.27 | −0.54 | −0.35 | −0.37 | −0.25 |
| Conditional expression (14) | 0.54 | 0.56 | 0.53 | 0.54 | 0.67 | 0.45 | 0.47 |
| Conditional expression (15) | −0.44 | −0.50 | −0.46 | −0.45 | −0.35 | −0.33 | −0.34 |
| Conditional expression (16) | 0.43 | 0.42 | 0.45 | 0.42 | 0.25 | 0.45 | 0.44 |
| Conditional expression (17) | 1.52 | 1.50 | 1.53 | 1.49 | 1.50 | 1.49 | 1.56 |
| Conditional expression (18) | 0.62 | 0.53 | 0.61 | 0.54 | 0.77 | 0.56 | 0.59 |
| Conditional expression (19) | 81.61 | 76.03 | 81.61 | 76.03 | 76.03 | 76.03 | 60.74 |
| Conditional expression (20) | −0.48 | −0.38 | −0.48 | −0.40 | −0.31 | −0.58 | −0.51 |
| Conditional expression (21) | −0.54 | −0.37 | −0.51 | −0.35 | −0.54 | −0.40 | −0.46 |
| Conditional expression (22) | 18.09 | 18.22 | 19.36 | 23.96 | 32.10 | 35.30 | 29.54 |
| Conditional expression (23) | 0.32 | 0.32 | 0.32 | 0.32 | 0.30 | 0.32 | 0.32 |
| Conditional expression (24) | 29.72 | 23.96 | 23.96 | 23.96 | 26.52 | 29.72 | 23.96 |

As is obvious from Table 8, numeric values associated with the first to seventh embodiments satisfy the conditional expressions (1) to (24), and as is obvious from the aberration diagrams of the respective embodiments, the aberrations are corrected properly.

Next, a projector unit which installs the zoom lens according to the embodiment will be described.

As is shown in FIG. 15, a protector according to the invention is formed substantially into a rectangular parallelepiped shape and has a lens cover 19 which covers a projection port provided to a side of a front panel 12 of a main body case, and in addition, a plurality of vent holes 18 are provided in the front panel 12.

In addition, although the illustration thereof in FIG. 15 is omitted, a key/indicator part is provided on an top panel 11 of a main body case, and provided on this key/indicator part has keys and indicators including a power switch key, a power indicator for informing an ON or OFF state of power, a lamp switch key for turning on a lamp of a light source device, a lamp indicator for indicating the illumination of the lamp, and an overheat indicator for informing the overheat of the light source when it actually occurs.

Furthermore, on a back side, not shown, of the main body case, an I/O connector portion where USB terminal, image inputting D-SUB terminal, S terminal, RCA terminal and the like are provided, a power supply adapter plug, and an Ir receiving portion which receives signals from a remote controller are provided on a back panel.

What is claimed is:

1. A zoom lens comprising, in order from a magnifying side, a first lens group having a positive or negative refractive power as a whole, a second lens group having a negative refractive power as a whole, a third lens group having a positive refractive power as a whole, and a cover glass, wherein:

changing the magnification of a whole lens system thereof is attained by configuring such that while a magnification varying operation is in effect, the first lens group is left fixed, the second lens group is made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the third lens group is made to move on the optical axis in such a manner as to move in a direction from the contracting side to the magnifying side over a range from the wide angle end to the telephoto end, and wherein, the following conditional expression (1) is satisfied with respect to a power set at the second lens group, the following conditional expression (2) is satisfied with respect to a power set at the third lens group, and the following conditional expression (3)

is satisfied with respect to an airspace set on a contracting side of the third lens group at the wide angle end;

$$-1.1 < f_w/f_{II} < -0.45 \quad (1)$$

$$0.4 < f_w/f_{III} < 0.6 \quad (2)$$

$$1.7 < d_{wIII}/f_w \quad (3)$$

where $f_w$: composite focal length of the whole lens system at the wide angle end in which it is focused at a magnifying side object distance of 1700 mm from a lens surface of the first lens group which is situated closest to the magnifying side;

$f_{II}$: composite focal length of the second lens group;

$f_{III}$: composite focal length of the third lens group;

$d_{wIII}$: airspace between the third lens group and said cover glass at the wide angle end.

2. A zoom lens as set forth in claim 1, wherein the first lens group is made up by disposing a positive lens element having a positive refractive power or a negative lens element having a negative refractive power, and wherein the following conditional expression (4) is satisfied with respect to a power set at the first lens group:

$$|f_w/f_I| < 0.3 \quad (4)$$

where, $f_I$: composite focal length of the first lens group.

3. A zoom lens as set forth in claim 1, wherein the second lens group is made up by disposing, in order from the magnifying side, a second a lens group and a second b lens group, wherein the second a lens group is made up by disposing, in order from the magnifying side, a meniscus negative lens element which is made convex towards the magnifying side, a negative lens element and a positive lens element, and the second b lens group has a refracting surface on a side lying closest to the magnifying side which is a surface made heavily concave towards the contracting side and a refracting surface on a side lying closest to the contracting side which is a surface made convex towards the contracting side and is made up by disposing one to three lens elements, and wherein the following conditional expression (5) is satisfied with respect to a power set at the second a lens group, the following conditional expression (6) is satisfied with respect to a power set at the second b lens group, and the following conditional expression (7) is satisfied with respect to a size of the second lens group on the optical axis:

$$-0.9 < f_w/f_{IIa} < -0.2 \quad (5)$$

$$-0.4 < f_w/f_{IIb} < 0.1 \quad (6)$$

$$1.1 < T_{II}/f_w < 2.4 \quad (7)$$

where, $f_{IIa}$: composite focal length of the second a lens group which makes up the second lens group;

$f_{IIb}$: composite focal length of the second b lens group which makes up the second lens group;

$T_{II}$: a distance on the optical axis between a magnifying side surface of a lens element of the second lens group which is disposed closest to the magnifying side and a contracting side surface of a lens element of the second lens group which is disposed closest to the contracting side.

4. A zoom lens as set forth in claim 3, wherein the following conditional expression (8) is satisfied with respect to a configuration of a contracting side surface of a lens element of the second a lens group which is disposed closest to the magnifying side, the following conditional expression (9) is satisfied with respect to the characteristics of the refractive index of a glass material which is used for each of the lens elements which make up the second a lens group, the following conditional expression (10) is satisfied with respect to the dispersing characteristics of the glass material used for each of the lens elements which make up the second a lens group, and the following conditional expression (11) is satisfied with respect to a configuration of a magnifying side surface of a lens element of the second b lens group which is disposed closest to the magnifying side:

$$0.85 < f_w/r_{IIa2} < 1.6 \quad (8)$$

$$1.65 < N_{IIa} \quad (9)$$

$$V_{IIaP} - V_{IIaN} < -9.0 \quad (10)$$

$$-1.6 < f_w/r_{IIb1} < -0.8 \quad (11)$$

where, $r_{IIa2}$: radius of curvature of the contracting side surface of the lens element of the second a lens group which is disposed closest to the magnifying side;

$r_{IIb1}$: radius of curvature of the magnifying side surface of the lens element of the second b lens group which is disposed closest to the magnifying side;

$N_{IIa}$: mean value of the refractive indexes of the respective lens elements which make up the second a lens group relative to the d line;

$V_{IIaP}$: mean value of Abbe numbers of the respective positive lens elements which make up the second a lens group;

$V_{IIaN}$: mean value of Abbe numbers of the respective negative lens elements which make up the second a lens group.

5. A zoom lens as set forth in claim 3, wherein at least the magnifying side surface of a lens element of the second a lens group making up the second lens group which is disposed closest to the magnifying side is preferably aspheric, and wherein the following conditional expression (12) is satisfied with respect to a power to be set, and the following conditional expression (13) is satisfied with respect to a configuration of a magnifying side surface of a lens element of the second a lens group which is disposed second closest to the magnifying side:

$$-1.0 < f_w/f_{IIa1} < -0.45 \quad (12)$$

$$-0.7 < f_w/r_{IIa3} < -0.15 \quad (13)$$

where, $f_{IIa1}$: focal length of the lens element making up the second a lens group which is disposed closest to the magnifying side;

$r_{IIa3}$: radius of curvature of the magnifying side surface of the lens element making up the second a lens group which is disposed second closest to the magnifying side.

6. A zoom lens as set forth in claim 1, wherein the third lens group is made up by disposing, in order from the magnifying side, a third a lens group, a third b lens group and a third c lens group, wherein the third a lens group has a positive refractive power as a whole and is made up by disposing one or two positive lens elements, the third b lens group has a negative refractive power as a whole and is made up of one negative lens element or by disposing one negative lens element and one positive lens element, and the third c lens group has a positive refractive power as a whole and is made up by disposing two positive lens elements and one negative lens element, and wherein the following conditional expression (14), conditional expression (15) and conditional expression (16) are satisfied with respect to powers set at the third a lens group, third b lens group and third c lens group, respectively, and the following conditional expression (17) is satisfied with respect to the characteristics of the refractive index of a glass material used for each of the positive lens elements which make up the third lens group:

$$0.35 < f_w/f_{IIIa} < 0.8 \tag{14}$$

$$-0.65 < f_w/f_{IIIb} < -0.25 \tag{15}$$

$$0.2 < f_w/f_{IIIc} < 0.55 \tag{16}$$

$$N_{IIIP} < 1.65 \tag{17}$$

where, $f_{IIIa}$: composite focal length of the third a lens group which makes up the third lens group;

$f_{IIIb}$: composite focal length of the third b lens group which makes up the third lens group;

$f_{IIIc}$: composite focal length of the third c lens group which makes up the third lens group;

$N_{IIIP}$: mean value of refractive indexes of the respective positive lens elements which make up the third lens group relative to the line d.

7. A zoom lens as set forth in claim 6, wherein the following conditional expression (18) is satisfied with respect to the configuration of a magnifying side surface of a lens element of the third a lens group which is disposed closest to the magnifying side, and the following conditional expression (19) is satisfied with respect to the dispersion characteristics of a glass material which is used for each of the lens elements which make up the third a lens group:

$$0.45 < f_w/r_{IIIa1} < 0.95 \tag{18}$$

$$50 < V_{IIIa} \tag{19}$$

where, $r_{IIIa1}$: radius of curvature of the magnifying side surface of the lens element of the third a lens group which is disposed closest to the magnifying side;

$V_{IIIa}$: mean value of Abbe numbers of the respective lens element which make up the third a lens group.

8. A zoom lens as set forth in claim 6, wherein the following conditional expression (20) is satisfied with respect to the configuration of a magnifying side surface of a lens element of the third b lens group which is disposed closest to the magnifying side:

$$-0.7 < f_w/r_{IIIb1} < -0.25 \tag{20}$$

where, $r_{IIIb1}$: radius of curvature of the magnifying side surface of the lens element of the third b lens group which is disposed closest to the magnifying side.

9. A zoom lens as set forth in claim 6, wherein the following conditional expression (21) is satisfied with respect to the configuration of a contracting side surface of a lens element of the third c lens group which is disposed closest to the contracting side, and the following conditional expression (22) is satisfied with respect to the dispersion characteristics of a glass material which is used for each of the lens elements which make up the third c lens group $$-0.65 < f_w/r_{IIIc5} < -0.3 \tag{21}$$

$$15 < V_{IIIcP} - V_{IIIcN} \tag{22}$$

where, $r_{IIIc5}$: radius of curvature of the contracting side surface of the lens element of the third c lens group which is disposed closest to the contracting side;

$V_{IIIcP}$: mean value of Abbe numbers of the respective positive lens elements which make up the third c lens group;

$V_{IIIcN}$: mean value of Abbe numbers of the respective negative lens elements which make up the third c lens group.

10. A zoom lens as set forth in claim 6, wherein the third c lens group is made up by including a partial system constituent element which is made up of at least two lens elements, one negative lens element and one positive lens element, which are cemented together, and wherein the following conditional expression (23) is satisfied with respect to the characteristics of the refractive index of a glass material used for each of the lenses which are cemented together, and the following conditional expression (24) is satisfied similarly with respect to the dispersion characteristics of the glass material used for each of the lens elements which are cemented together $$0.25 < N_{IIIcCN} - N_{IIIcCP} \tag{23}$$

$$25 < V_{IIIcCP} - V_{IIIcCN} \tag{24}$$

where, $N_{IIIcCP}$: mean value of the refractive indexes of the positive lens elements of the third c ens group which are disclosed in the cemented partial system thereof relative to the line d;

$N_{IIIcCN}$: mean value of the refractive indexes of the negative lens elements of the third c lens group which are disposed in the cemented partial system thereof relative to the line d;

$V_{IIIcCP}$: mean value of Abbe numbers of the positive lens elements of the third c lens group which are disposed in the cemented partial system thereof;

$V_{IIIcCN}$: mean value of Abbe numbers of the negative lens elements of the third c lens group which are disposed in the cemented partial system thereof.

11. A projector unit which installs the zoom lens set forth in claim 1.

* * * * *